United States Patent [19]

Ishibashi et al.

[11] Patent Number: 5,822,504
[45] Date of Patent: *Oct. 13, 1998

[54] FONT PACKING DEVICE AND FONT UNPACKING DEVICE

[75] Inventors: Masayuki Ishibashi; Yoshikuni Yokota, both of Inagi, Japan

[73] Assignee: Fujitsu Isotec Limited, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 712,957

[22] Filed: Sep. 12, 1996

Related U.S. Application Data

[63] Continuation of Ser. No. 89,965, Jul. 9, 1993.

[30] Foreign Application Priority Data

Oct. 8, 1992 [JP] Japan ..................................... 4-270250

[51] Int. Cl.⁶ .................................................. G06F 15/00
[52] U.S. Cl. ............................ 395/110; 395/114; 395/115
[58] Field of Search .................................... 395/114, 110, 395/112, 115, 116, 167, 168, 169, 170, 171, 805, 512, 515, 517, 521; 358/426, 261.1, 261.2, 261.3, 427, 261.4, 444; 382/177, 178, 179, 224, 185, 193, 198, 217; 345/512, 515, 517, 521, 467, 468, 469, 470–471; 707/542

[56] References Cited

U.S. PATENT DOCUMENTS

| | | | |
|---|---|---|---|
| 4,824,266 | 4/1989 | Fujii et al. | 395/110 |
| 5,199,803 | 4/1993 | Shimizu et al. | 395/110 |
| 5,207,517 | 5/1993 | Ito | 395/110 |
| 5,272,768 | 12/1993 | Bauman et al. | 395/110 |
| 5,347,266 | 9/1994 | Bauman et al. | 395/110 |
| 5,409,318 | 4/1995 | Imamiya | 395/110 |

*Primary Examiner*—Edward L. Coles
*Assistant Examiner*—Dov Popovici
*Attorney, Agent, or Firm*—Helfgott & Karas, P.C.

[57] ABSTRACT

Font packing device and font unpacking device aims at storing a bit map font at a high packing ratio, and processing and unpacking the packed data with a simple hardware configuration at a high speed. Bit map data of each character is equally divided into a plurality of blocks. If the plural blocks share the same bit map data, then the bit map data is stored for only one block collectively. At this time, addresses indicating the storage area of the shared bit map data for the other blocks are stored. If a bit map data is used for one block only and not shared with any other blocks, then the data is stored with an address indicating the storage area.

10 Claims, 22 Drawing Sheets

BIT MAP DATA STRING OF DATA UNIT

| Label | Content |
|---|---|
| A-01 | BIT MAP DATA IN BLOCK 1 SHOWN IN FIGURE 3 |
| A-02 | BIT MAP DATA IN BLOCK 2 SHOWN IN FIGURE 3 |
| A-03 | BIT MAP DATA IN BLOCK 3 SHOWN IN FIGURE 3 |
| A-04 | BIT MAP DATA IN BLOCK 4 SHOWN IN FIGURE 3 |
| A-05 | BIT MAP DATA IN BLOCK 5 SHOWN IN FIGURE 3 |
| A-06 | BIT MAP DATA IN BLOCK 6 SHOWN IN FIGURE 3 |
| A-07 | BIT MAP DATA IN BLOCK 7 SHOWN IN FIGURE 3 |
| A-08 | BIT MAP DATA IN BLOCK 8 SHOWN IN FIGURE 3 |
| A-09 | BIT MAP DATA IN BLOCK 9 SHOWN IN FIGURE 3 |
| A-10 | BIT MAP DATA IN BLOCK 10 SHOWN IN FIGURE 3 |
| A-11 | BIT MAP DATA IN BLOCK 11 SHOWN IN FIGURE 3 |
| A-12 | BIT MAP DATA IN BLOCK 12 SHOWN IN FIGURE 3 |
| A-13 | BIT MAP DATA IN BLOCK 13 SHOWN IN FIGURE 3 |
| A-14 | BIT MAP DATA IN BLOCK 15 SHOWN IN FIGURE 3 |
| A-15 | BIT MAP DATA IN BLOCK 16 SHOWN IN FIGURE 3 |
| A-16 | BIT MAP DATA IN BLOCK 17 SHOWN IN FIGURE 3 |
| A-17 | BIT MAP DATA IN BLOCK 18 SHOWN IN FIGURE 3 |
| A-18 | BIT MAP DATA IN BLOCK 19 SHOWN IN FIGURE 3 |
| A-19 | BIT MAP DATA IN BLOCK 22 SHOWN IN FIGURE 3 |
| A-20 | BIT MAP DATA IN BLOCK 24 SHOWN IN FIGURE 3 |
| A-21 | BIT MAP DATA IN BLOCK 25 SHOWN IN FIGURE 3 |
| A-22 | BIT MAP DATA IN BLOCK 26 SHOWN IN FIGURE 3 |
| A-23 | BIT MAP DATA IN BLOCK 27 SHOWN IN FIGURE 3 |
| A-24 | BIT MAP DATA IN BLOCK 28 SHOWN IN FIGURE 3 |
| A-25 | BIT MAP DATA IN BLOCK 30 SHOWN IN FIGURE 3 |
| A-26 | BIT MAP DATA IN BLOCK 31 SHOWN IN FIGURE 3 |
| A-27 | BIT MAP DATA IN BLOCK 32 SHOWN IN FIGURE 3 |
| A-28 | BIT MAP DATA IN BLOCK 34 SHOWN IN FIGURE 3 |
| B-29 | BIT MAP DATA IN BLOCK 3 SHOWN IN FIGURE 10 |
| B-30 | BIT MAP DATA IN BLOCK 6 SHOWN IN FIGURE 10 |
| B-31 | BIT MAP DATA IN BLOCK 13 SHOWN IN FIGURE 10 |
| B-32 | BIT MAP DATA IN BLOCK 15 SHOWN IN FIGURE 10 |
| B-33 | BIT MAP DATA IN BLOCK 18 SHOWN IN FIGURE 10 |
| B-34 | BIT MAP DATA IN BLOCK 19 SHOWN IN FIGURE 10 |
| B-35 | BIT MAP DATA IN BLOCK 21 SHOWN IN FIGURE 10 |
| B-36 | BIT MAP DATA IN BLOCK 24 SHOWN IN FIGURE 10 |
| B-37 | BIT MAP DATA IN BLOCK 27 SHOWN IN FIGURE 10 |
| B-38 | BIT MAP DATA IN BLOCK 29 SHOWN IN FIGURE 10 |
| B-39 | BIT MAP DATA IN BLOCK 30 SHOWN IN FIGURE 10 |
| B-40 | BIT MAP DATA IN BLOCK 33 SHOWN IN FIGURE 10 |
| B-41 | BIT MAP DATA IN BLOCK 36 SHOWN IN FIGURE 10 |

FIG. 11

| A-01 | A-07 | A-13 | A-19 | A-25 | A-31 |
|------|------|------|------|------|------|
| A-02 | A-08 | A-08 | A-08 | A-26 | A-32 |
| A-03 | A-09 | A-15 | A-15 | A-27 | A-03 |
| A-04 | A-10 | A-16 | A-22 | A-17 | A-34 |
| A-05 | A-11 | A-17 | A-11 | A-29 | A-03 |
| A-06 | A-12 | A-18 | A-24 | A-30 | A-03 |

FIG. 12A

| A-03 | A-03 | B-31 | B-34 | A-03 | A-03 |
|------|------|------|------|------|------|
| A-03 | A-03 | A-05 | A-03 | A-03 | A-03 |
| B-29 | A-15 | B-32 | B-35 | B-37 | B-40 |
| A-03 | A-03 | A-05 | A-03 | A-03 | A-03 |
| A-03 | A-03 | A-05 | A-03 | B-38 | A-03 |
| B-30 | A-15 | B-33 | B-36 | B-39 | B-41 |

FIG. 12B

|  | LSB(1) | 2 | 3 | 4 | 5 | 6 | 7 | MSB(8) |  |
|---|---|---|---|---|---|---|---|---|---|
| 307-1 |  |  |  |  |  |  |  |  | (FOR STORING IN $BL_i - CL_1$) |
| 307-2 |  |  |  |  |  |  |  |  | (FOR STORING IN $BL_i - CL_2$) |
| 307-3 |  |  |  |  |  |  |  |  | (FOR STORING IN $BL_i - CL_3$) |
| 307-4 |  |  |  |  |  |  |  |  | (FOR STORING IN $BL_i - CL_4$) |
| 307-5 |  |  |  |  |  |  |  |  | (FOR STORING IN $BL_i - CL_5$) |
| 307-6 |  |  |  |  |  |  |  |  | (FOR STORING IN $BL_i - CL_6$) |
| 307-7 |  |  |  |  |  |  |  |  | (FOR STORING IN $BL_i - CL_7$) |
| 307-8 |  |  |  |  |  |  |  |  | (FOR STORING IN $BL_i - CL_8$) |

FIG. 14

FONT PACKING DEVICE AND FONT UNPACKING DEVICE

This is a continuation of application Ser. No. 08/089,965, filed Jul. 9, 1993.

BACKGROUND OF THE INVENTION

1. Field of the Invention

The present invention relates to a bit-map-font packing/unpacking device, and to a storage unit for storing a packed bit map font.

2. Description of the Prior Art

A font is a set of character patterns commonly and generally determined for each set of characters such as alphanumeric characters, Kana, that is, Japanese characters, and Kanji, that is, Chinese characters. It is stored in storing media such as a ROM (read only memory) in a controller of a printer or a display unit, etc. A character code transmitted from a host unit is converted to corresponding bit map data, and stored in a line buffer or a frame buffer (page memory) by the controller.

There are a variety of fonts such as a Mincho type, a Gothic type, etc. These fonts are stored in storing media such as a ROM and an IC card, etc. in a bit map format of a printed (displayed) image.

However, with the increasing demand for high-quality printed and displayed characters, the configuration of a dot matrix of bit map data to be represented in a bit map font format has been changed to very high-density (high-resolution) representation, from 24×24 dots to 48×48 dots. If a bit map font is represented by 48×48 dots, high-quality characters can be printed by a serial printer as if they were printed by a 300 or 360 dpi (dot per inch). However, since the amount of bit-map-font data greatly increases if the bit map font is represented in high resolution, various methods for packing a bit map font and storing it in storing media have been developed.

Typical example of these packing and storing methods is to perform a run-length encoding process by dividing bit map data of each bit-map-font character into on-dots (for example, "black") and off-dots (for example, "white"), and then store the data encoded through the run-length encoding process in storing media such as an ROM, etc. In this method, run-length encoded data should be decoded and unpacked to the bit map data composed of on-dots and off-dots.

When high-density dot matrix data such as a high-density (high-resolution) bit map font which is represented by on-dots and off-dots are packed and unpacked, the packing ratio is very low around ⅔ in the conventional methods such as the run-length encoding method. Furthermore, a specific circuit is required to unpack data, and, when bit map data for each of the characters printed in the vertical direction are rotated (for example, 90 degrees counterclockwise), the data cannot be rotated until they have been completely unpacked for each character. If such a rotating process is performed by a specific hardware circuit, it should be undesirably complicated. On the other hand, if the rotating process is to be realized by firmware, the hardware can be configured simply, but must be slow in process speed.

Recently, an outline font has been widely used. It can be processed at a high packing ratio, while the process quality tends to be deteriorated in data having the density lower than 68×68 dots per character. Furthermore, since a complex process is required when a character is stored as bit map data, a low-level device becomes delayed while unpacking data. Therefore, it is only applicable to a high-level device, not for personal use.

SUMMARY OF THE INVENTION

The present invention aims at providing a font packing device for packing a bit map font at a high packing ratio and storing the resultant data, and a font storing device for storing the packed bit map font. It further aims at providing a font unpacking device for unpacking packed data at a high speed. Another object of the present invention is to provide a font unpacking device for easily realizing a data processing operation such as rotating a character, etc.

The font packing device according to the present invention divides bit map data of each character in a bit map font into a plurality of rectangular areas (including squares) by a dividing unit, and detects rectangular areas containing the same bit map data by a detecting unit.

If the detecting unit has detected a plurality of rectangular areas containing the same bit map data, a bit map data storing unit stores for one block the bit map data shared among the plural rectangular areas. If a rectangular area has a bit map data which is not shared by another rectangular area, the bit map data storing unit stores the bit map data singly.

An address information storing unit stores address information designating the storage area in the bit map data storing unit in which bit map data of each of the rectangular areas are stored for each of the divided portions of a character.

A font storing device according to the present invention comprises the bit map data storing unit and the address information storing unit. If a plurality of rectangular areas contain the same bit map data in rectangular areas forming each character, the bit map data storing unit stores for one block the bit map data shared among the plural rectangular areas. If a rectangular area has a bit map data which is not shared by another rectangular area, the bit map data storing unit stores the bit map data singly. Thus, bit map data are not stored in duplicate.

The address information storing unit also stores address information designating the storage area in the bit map data storing unit in which bit map data of each of the rectangular areas of a character is stored.

Accordingly, since a bit map data is not stored in duplicate when the font storing device stores bit map data of a plurality of characters, the amount of data can be effectively packed even if a number of character fonts are stored.

When the bit map data stored as packed in the above described font storing device are unpacked, the font unpacking device according to the present invention instructs a bit map data reading unit to read from the bit map data storing unit bit map data in each of the rectangular areas forming each character according to the address information on the character to be unpacked and after being stored in the address information storing unit in the above described font storing device. Then, the unpacking device unpacks packed data to a character font by combining bit map data of each of the rectangular areas read by the bit map data reading unit.

That is, the font unpacking device according to the present invention receives address information designating the storage area in the bit map data storing unit in which bit map data of a character to be unpacked to according to the address information stored in the address information storing unit of the font storing device are stored. Then, the font unpacking device unpacks data to a bit map font according to the address information. Consequently, it does not require a complicated unpacking process in which encoded data must be decoded, thereby greatly speeding up the unpacking process.

BRIEF DESCRIPTION OF THE DRAWINGS

FIG. 5 is a chart containing block numbers to be used when each block is referred to;

FIG. 11 shows an example of bit map data stored in the data unit;

FIGS. 12A and 12B show an example of the correspondence between a block and a storage address of bit map data;

FIG. 14 shows an example of the configuration of a data reading register;

DESCRIPTION OF THE PREFERRED EMBODIMENTS

Figure 1:
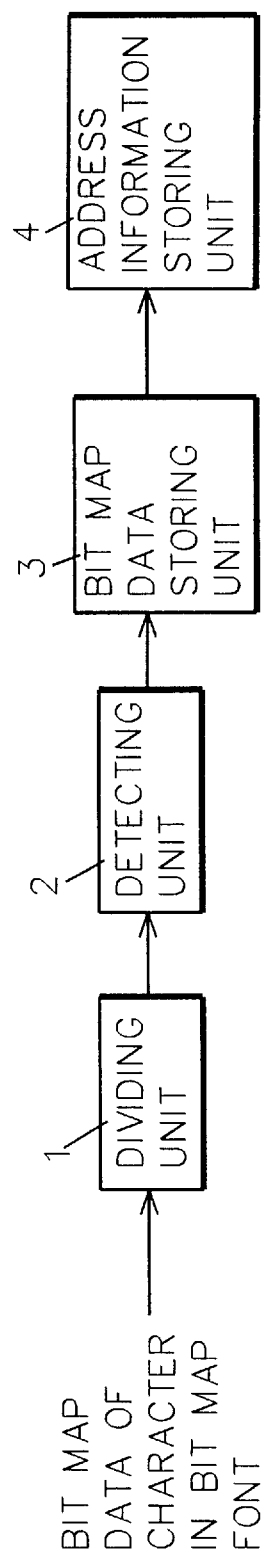
FIG. 1 is a diagram (1) showing the principle of the present invention.

Embodiments of the present invention are explained below by referring to the attached drawings. FIG. 1 is a block diagram showing the principle of the font packing device according to the present invention.

The font packing device comprises the following components. A dividing unit 1 equally divides bit map data of each character (generally including a symbol and a graph) in a bit map font into a plurality of rectangular areas (blocks). A detecting unit 2 detects rectangular areas containing the same bit map data among a plurality of rectangular areas forming each of the characters equally divided by the dividing unit 1. If a plurality of rectangular areas containing the same bit map data have been detected by the detecting unit 2, then a bit map data storing unit 3 stores for one block the bit map data shared among the plural rectangular areas. If a rectangular area has a bit map data which is not shared by another rectangular area, the bit map data storing unit stores the bit map data singly. An address information storing unit 4 stores address information designating the storage area in the bit map data storing unit 3 in which bit map data are stored for each of the equally divided rectangular areas forming a character.

The dividing unit 1 can be designed such that a character is equally divided into rectangular areas of the size appropriate as the data length handled in an internal process of the font unpacking device for unpacking data to, for example, a bit map font.

The bit map data packed by the font packing device are stored in the font storing device comprising the bit map data storing unit 3 and the address information storing unit 4.

Figure 2:
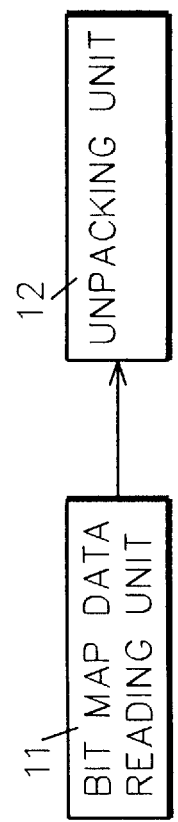
FIG. 2 is a diagram (2) showing the principle of the present invention.

FIG. 2 is a diagram showing the principle of the font unpacking device according to the present invention. The font unpacking device unpacks to a character font the bit map data packed by the above described font packing device and stored in the font storing device (for example, ROM). The font unpacking device comprises the following components.

A bit map data reading unit 11 obtains from the address information storing unit 4 of the font storing device an address in the bit map data storing unit 3 for storing bit map data of each of the rectangular areas forming a specified character, and reads from the bit map data storing unit 3 bit map data according to the address.

An unpacking unit 12 unpacks data to a character in a bit map font format by combining bit map data in each of the rectangular areas read by the bit map data reading unit 11.

The above described font packing device equally divides bit map data (for example, 48×48 dots) of a character into a plurality of rectangular areas (for example, 8×8 dots area) by the dividing unit 1.

Then, the detecting unit 2 detects whether or not a plurality of rectangular areas containing the same bit map data exist by comparing the type of bit map data between the rectangular areas of an equally divided character (block), or between the rectangular areas of different characters.

Next, if the detecting unit 2 has detected a plurality of rectangular areas containing the same bit map data, the bit map data storing unit 3 stores in its storing media the bit map data only for one block. If a rectangular area has a bit map data which is not shared by another rectangular area, the bit map data storing unit stores the bit map data in its storing media singly.

The address information storing unit 4 stores an address (pointer) designating the area in storing media in which bit map data of rectangular areas are stored for each of the rectangular areas forming each character.

Thus, bit map data of characters can be stored in the bit map data storing unit 3 as not being stored in duplicate, and address information designating the storage area in storing media in which bit map data of each of the rectangular areas forming each character are stored in the address information storing unit 4.

As a result, bit map data of a number of characters can be stored at a high packing ratio by equally dividing bit map data of each character in a bit map font into a plurality of rectangular areas, storing for one block a bit map data shared among a plurality of rectangular areas if the plural rectangular areas are detected to share the same bit map data, and preventing duplicate storage for the other rectangular areas having the same bit map data.

Especially, bit map data containing a large number of white dots such as frequently used simple characters can be packed at a high packing ratio. Examples of these simple characters composed of a number of rectangular areas containing much space are "1", "-", "L", etc., and about five-sixths of these characters is occupied by space.

The packing method according to the present invention requires a smaller capacity of the bit map data storage area, and the address space in the bit map data storage area is smaller than conventional methods. Therefore, the data length of an address used to address a bit map data storage area can be made smaller than in the conventional methods. On the other hand, the number of addresses equals the number of rectangular areas of all characters in a bit map font because bit map data of each character are stored after being divided into a plurality of rectangular areas. Accordingly, the total capacity of address storage becomes larger. That is, the packing method according to the present invention requires a storage capacity of an address storage area (an address unit) larger than that required by the conventional methods, while the total storage capacity of the bit map data storing unit 3 and the address information storing unit 4 is half of the total capacity required by the conventional methods as described later in detail. Therefore, a bit map font can be packed and stored at a high packing ratio. Furthermore, the reduction of the storage capacity required by the packing method according to the present invention becomes larger as the amount of data grows with a high resolution (high density) in a bit map font.

When bit map data packed by the above described font packing device are unpacked, the bit map data reading unit 11 of the font unpacking device reads bit map data in all rectangular areas of a specified character from the bit map data storing unit 3 according to the address information stored in the address information storing unit 4 of the font storing device.

The unpacking unit 12 reconstructs bit map data read by the bit map data reading unit 11 in a predetermined order so as to unpack the bit map data of a specified character.

At this time, the font unpacking device easily unpacks bit map data of specified characters from the packed and stored bit map font.

Furthermore, bit map data can be unpacked at a high speed by the font unpacking device by storing bit map data of each character after dividing them into a plurality of rectangular areas of size appropriate for an internal process performed by the font unpacking device.

When a specific character is processed so that it can be printed or displayed after being rotated, bit map data of each character can be stored into a desired format and stored in a line buffer (for a serial printer), a page memory (for a page printer), or to a frame buffer (for a display unit) after the process is performed in rectangular area units. Accordingly, the present method requires no memories for storing all bit map data of one character for the purpose of processing a character, and the memory storage capacity in which bit map data are processed can be made smaller.

Furthermore, since bit map data of a character can be processed in rectangular area units, they can be processed at a high speed by firmware only by adding a simple hardware configuration.

Figure 3:
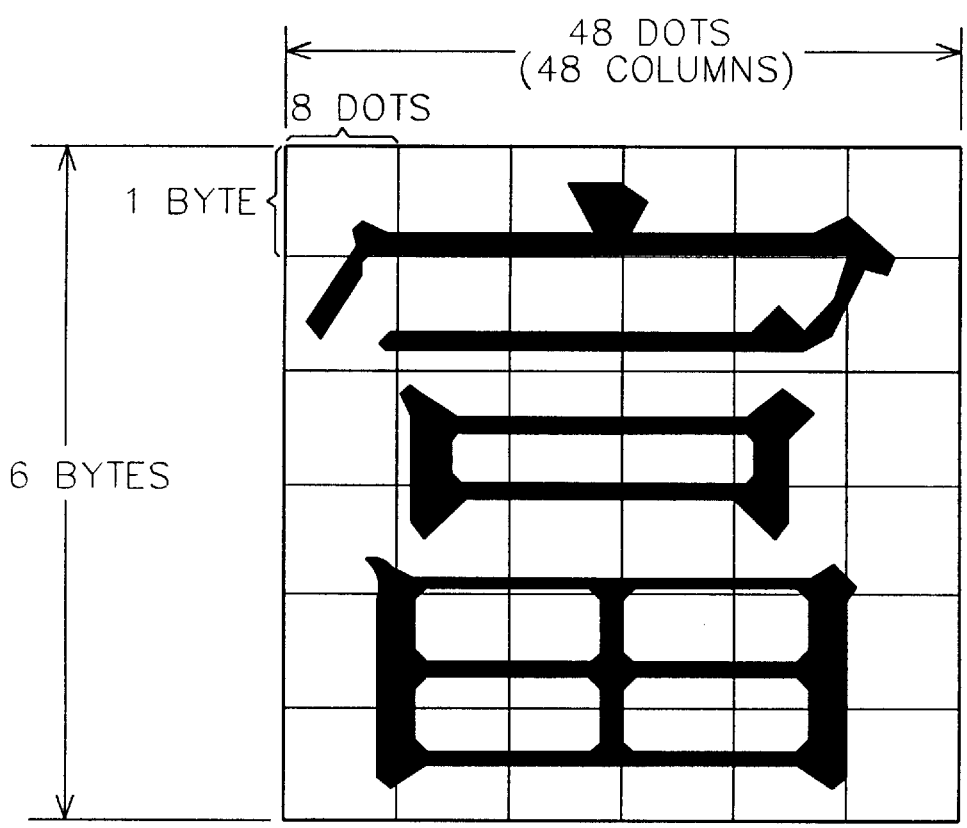
FIG. 3 shows a method of dividing a character into blocks as a preprocess of a data packing process according to an embodiment of the present invention.

A more practical embodiment is explained below by referring to the attached drawings. FIG. 3 shows a method of packing bit map data of each character in a bit map font according to the embodiment of the present invention. The following explanation relates to a method of packing and unpacking the bit map data of the bit map font in the 48×48 dot matrix format with the data processing system arranged for an 8-bit printer.

Figure 4:
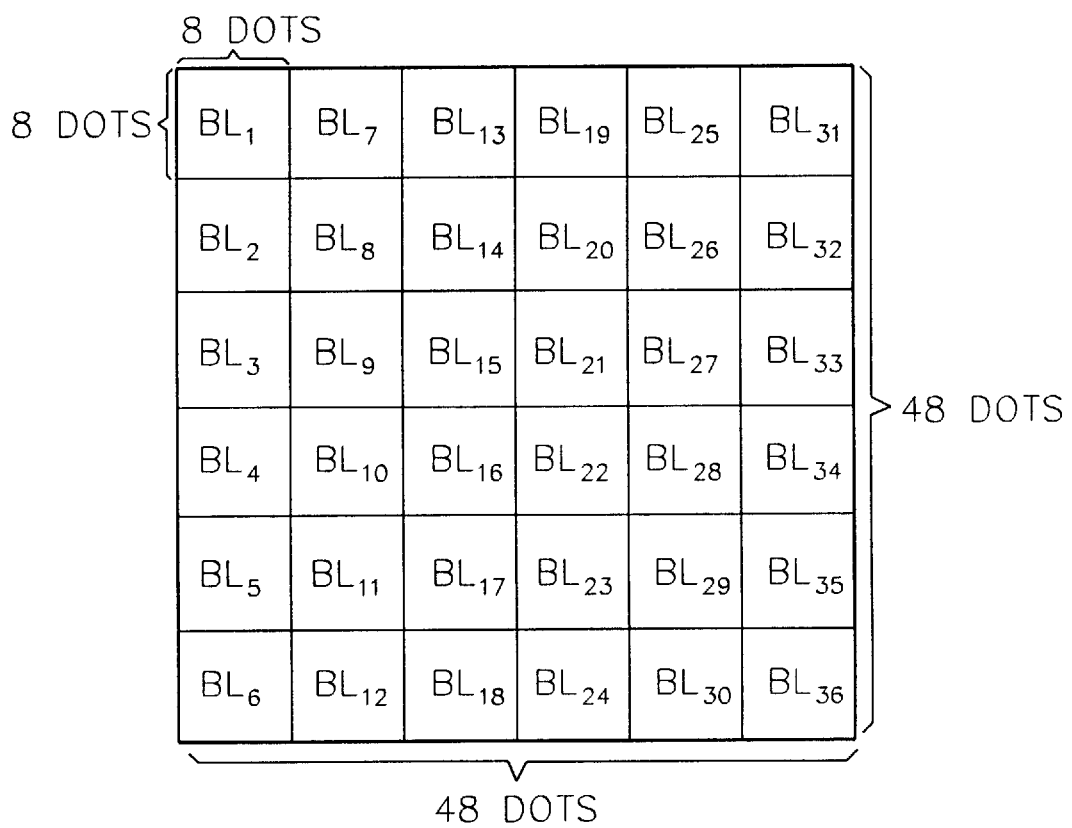
FIG. 4 shows an arrangement of 36 pieces of block data obtained by dividing one character/symbol of bit-map-font data.

FIG. 3 shows bit map data of 48×48 dot Kanji. In the present embodiment, these 48×48 dot bit map data are divided into 36 blocks (rectangular areas) each comprising 8×8 dots as shown in FIG. 4. With these divided blocks, each block is assigned serial numbers (block numbers) 1–36. As shown in FIG. 4, the block having the block number i (i=1, 2, . . . , 36) is indicated as block $BL_i$.

Figure 6:
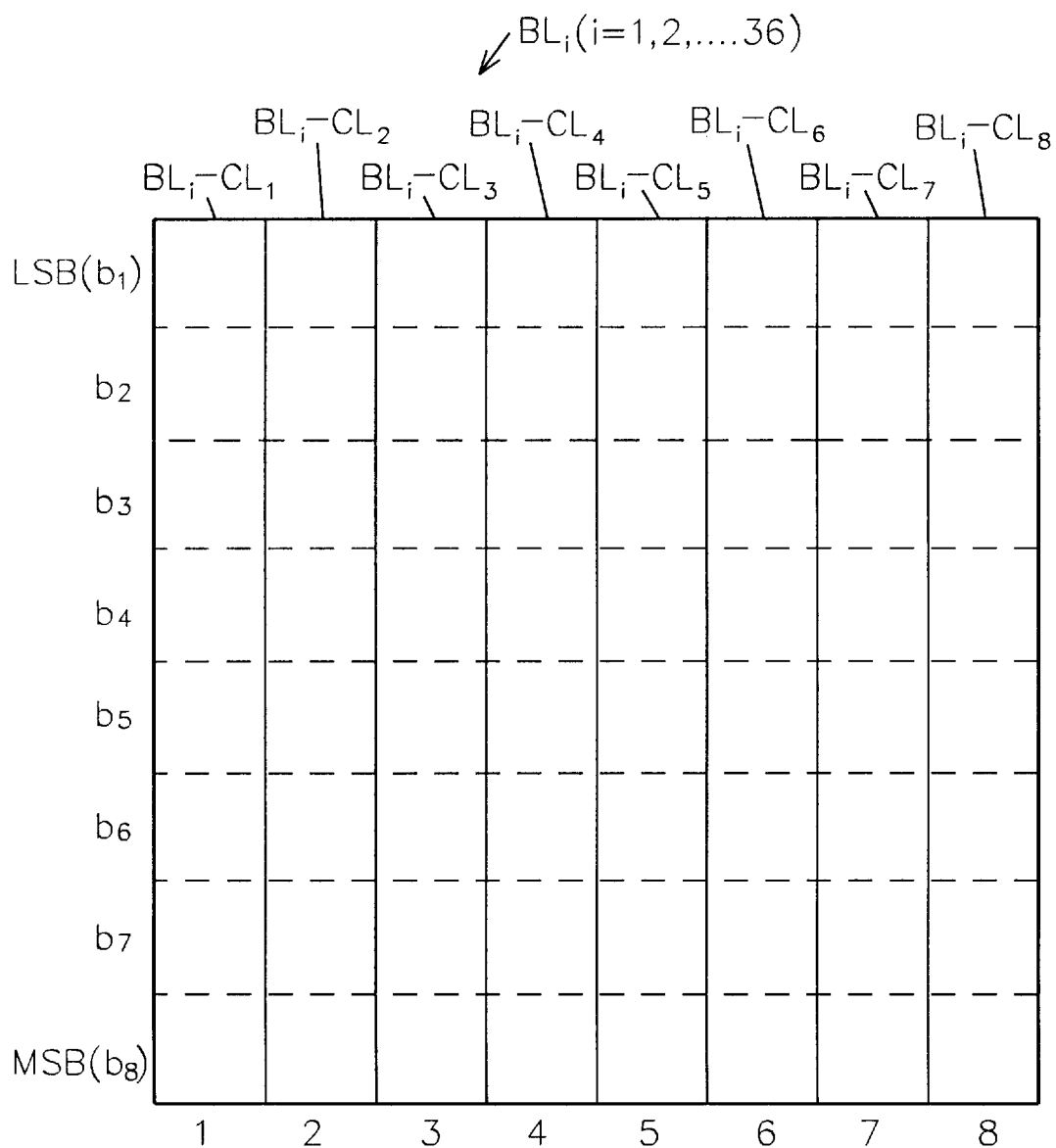
FIG. 6 shows a method of dividing a character into blocks when a bit map font is stored.

According to the present embodiment, each block $BL_i$ is divided into 8 bytes $BL_i\text{-}CL_1$, $BL_i\text{-}CL_2$, . . . , $BL_i\text{-}CL_8$ in the vertical direction as shown in FIG. 6. Thus, data are processed in byte units.

According to the bit map data shown in FIG. 3, some blocks share the same bit map pattern. That is, blocks $BL_3$, $BL_{33}$, $BL_{35}$, and $BL_{36}$ share the same bit map pattern. The bit map data of these blocks are 8-byte binary data represented by "00, 00, 00, 00, 00, 00, 00, 00"("00" is a hexadecimal representation).

Additionally, blocks $BL_8$, $BL_{14}$, and $BL_{20}$ share the same bit map pattern, and blocks $BL_{15}$, $BL_{21}$, $BL_{11}$, $BL_{23}$, $BL_{17}$, and $BL_{29}$ also share the same bit map pattern.

According to the present embodiment, the bit map data of each character are divided into 36 blocks $BL_1$–$BL_{36}$ each block being composed of 8×8 dots as shown in FIG. 4. For blocks $BL_i$, $BL_j$, . . . (i≠j) having the same bit map data, the bit map data is stored singly unless the bit map data is stored in the data unit (bit map data storing unit). At this time, each 8×8 dot bit map data of block $BL_i$ (i=1, 2, . . . , 36) is stored as an 8-byte binary data as shown in FIG. 6.

Figure 7:
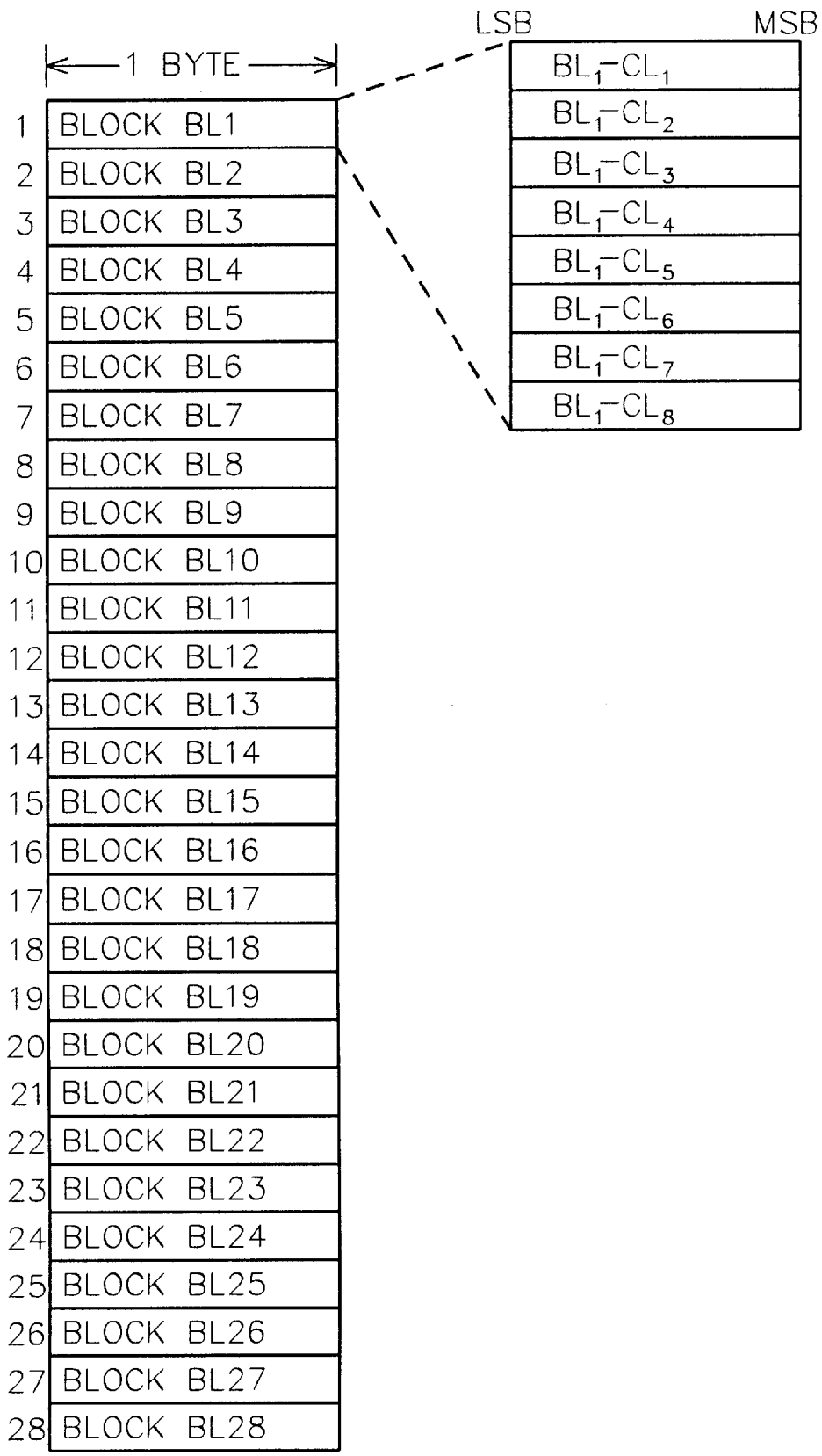
FIG. 7 shows a method of storing bit map data.

Therefore, 48×48 dot character bit map data shown in FIG. 3 are stored as 28 blocks $BL_1$, $BL_2$, . . . , $BL_{27}$, $BL_{28}$ as shown in FIG. 7 out of a total of 36 blocks $BL_1$–$BL_{36}$, each being stored as 1-byte binary data.

If bit map data of a character shown in FIG. 3 are stored as is without a packing process as in a conventional method, the requirement is 288 bytes (6 bytes×48 columns). According to the present embodiment, if the same bit map data is detected in a plurality of blocks in all characters to be processed, the bit map data is collectively stored. As a result, the requirement for the bit map data of the character shown in FIG. 3 is 224 bytes (28 blocks×8 bytes).

Thus, the requirement for storing bit map data according to the present packing method can be reduced by 64 bytes (288–224).

Figure 8:
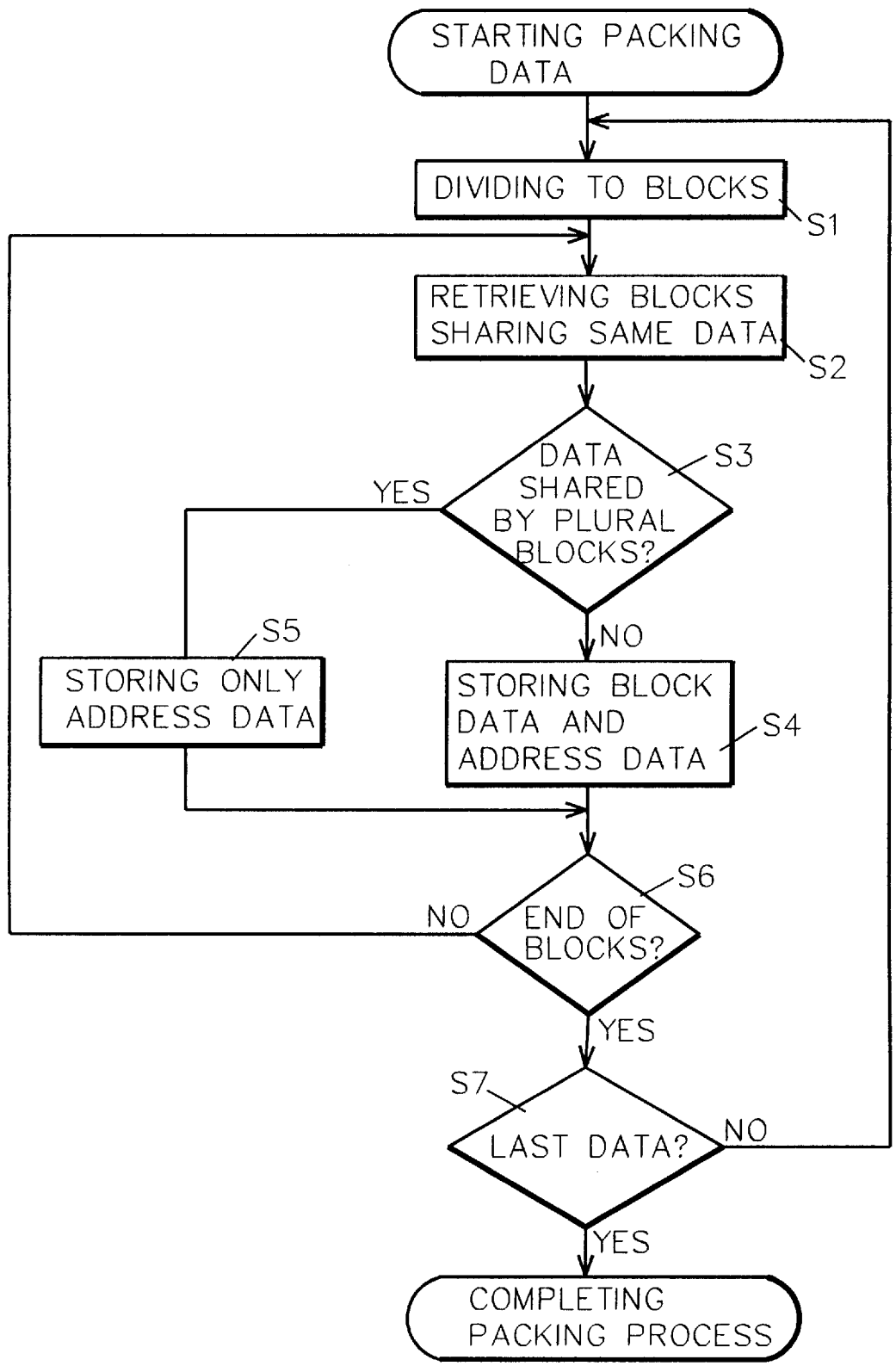
FIG. 8 is a flowchart for explaining the method of packing a bit map font according to the embodiment of the present invention.

Next, a method of realizing the above described data packing is explained by referring to the flowchart shown in FIG. 8. The data unit (bit map data storing unit) hereinafter referred to is an area in which bit map data blocks of all characters in a bit map font are stored; and the address unit (address information storing unit) is an area in which a pointer to a storage address in the above described data unit is stored for the bit map data blocks of all characters in a bit map font.

The operations in the flowchart shown in FIG. 8 are explained below. First, when bit map data of a character are entered, the bit map data are divided into 36 blocks $BL_1$–$BL_{36}$ (S1) in the format as shown in FIG. 4.

Next, each of the 36 blocks obtained by the above described division is checked whether or not each of the bit map data of the 36 blocks has been already stored in the data unit (S2 and S3). If no.("no" to S3), the bit map data, of the block is stored at a predetermined portion in the data unit of the storing media in the 8-byte binary data format, and the leading address of the storage area is stored in the address unit.

In the determining process S3, if bit map data has been already stored ("yes" to S3), the bit map data of the block are not stored in duplicate, and the leading address in the storage area of the data unit which stores the bit map data is stored (S5).

Figure 5:
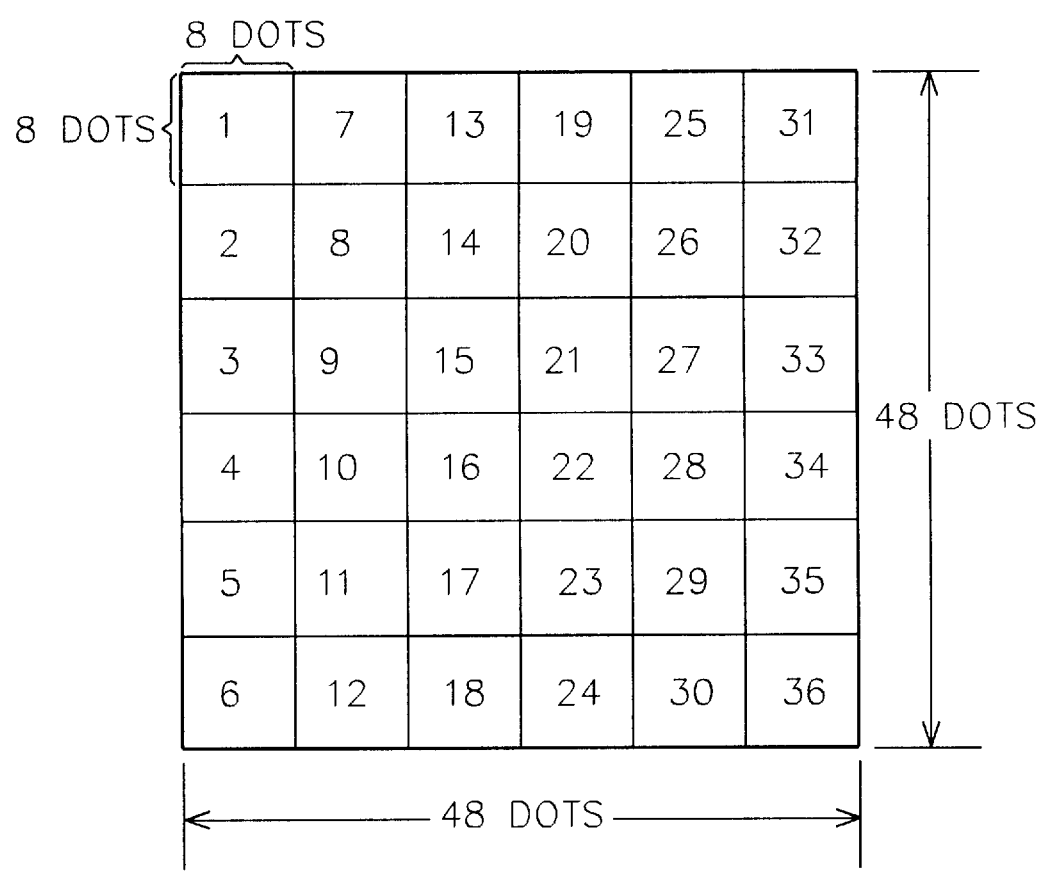

The above described processes S2–S5 are performed for all bit map data blocks of characters in the order of block numbers shown in FIG. 5 (until the determining process S6 outputs "yes"). If a plurality of blocks share a bit map data in all bit map data blocks forming a character, and the bit map data has not been stored, the bit map data is stored in the data unit for one block. If a block has bit map data different from that of all the other blocks, the bit map data is stored in the data unit. The leading addresses of the storage areas for all bit map data blocks stored in the data unit are stored in the address unit.

The above described processes S1–S5 are performed for all bit map data of all characters (until the determining process S7 outputs "yes), and all bit map data of all characters in a bit map font are packed and stored in the data unit, and the address unit stores leading addresses (pointers) of the storage areas for all bit map data blocks forming characters in a bit map font format and stored in the data unit.

Figure 9:
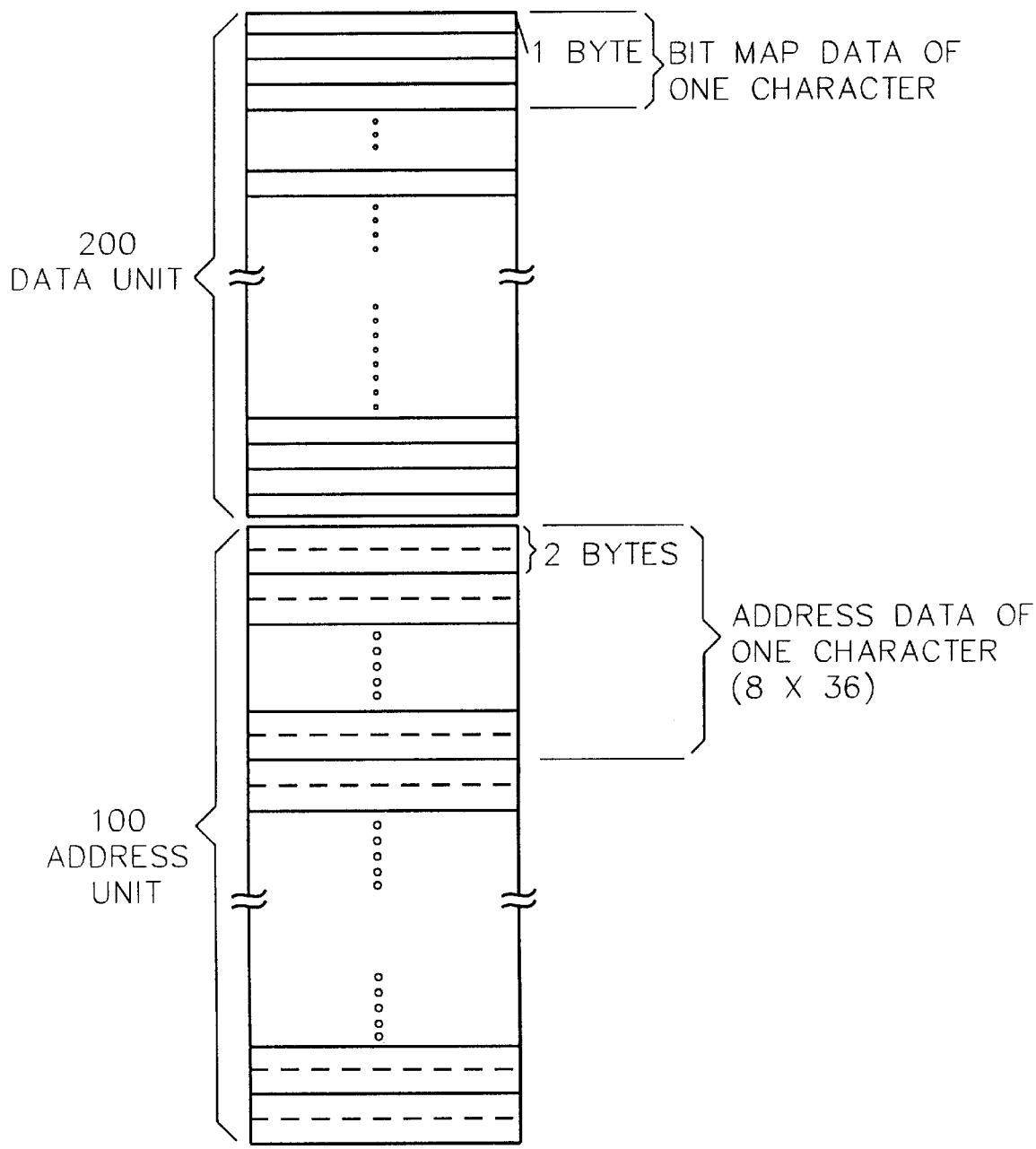
FIG. 9 shows a bit map font packing and storing format according to the embodiment of the present invention.

FIG. 9 shows the configuration of the storage area in which a bit map font is stored after being packed by the above described packing method.

In FIG. 9, a data unit 200 is an area in which bit map data of all characters in a bit map font are packed and stored in block units as described above; and an address unit 100 is an area in which leading addresses of bit map data in all blocks $BL_1$–$BL_{36}$ in a bit map font are stored in the data unit 200.

Figure 10:
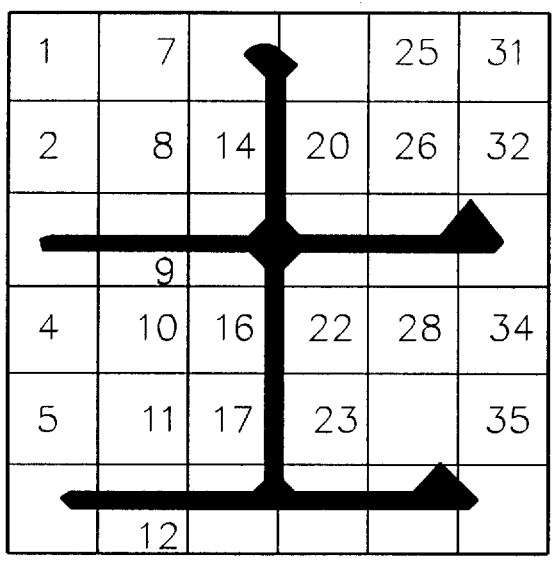
FIG. 10 shows a character font as divided into blocks.

Explained below are bit map data to be stored in the data unit 200 and address data to be stored in the address unit 100 when the character shown in FIG. 3 and the character shown in FIG. 10 are packed by the above described packing method.

The character shown in FIG. 3 indicates four blocks 3 ($BL_3$), 33 ($BL_{33}$), 35 ($BL_{35}$), and 36 ($BL_{36}$) having the same bit map data containing all white dots. At this time, if the bit map data has not been stored in the data unit 200, the bit map data of block 3, that is, the block having the smallest block number among the four blocks is stored in the data unit 200 as shown in FIG. 11. The bit map data of all the other blocks 33, 35, and 36 are not stored at all.

Likewise, if blocks 8 ($BL_8$), 14 ($BL_{14}$), and 20 ($BL_{20}$) share the same bit map data and the data has not been stored in the data unit 200, the bit map data of block 8 is stored in the data unit 200, and the bit map data of the other blocks 14 and 20 are not stored at all. Furthermore, if blocks 11 ($BL_{11}$) and 23 ($BL_{23}$), blocks 15 ($BL_{15}$) and 21 ($BL_{21}$), and blocks 17 ($BL_{17}$) and 28 ($BL_{28}$) share the same block respectively, and the bit map data has not been stored in the data unit 200, then the bit map data of blocks 11, 15, and 17 are stored in the data unit 200 respectively.

As a result, as shown in FIG. 11, the bit map data of 28 blocks are stored, and none of them are stored in duplicate for the same bit map data shared among any of 36 blocks of the character shown in FIG. 3.

Next, assuming that the bit map data of the character shown in FIG. 3 is packed as described above and stored in the data unit 200, the bit map data of the character shown in FIG. 10 is packed as follows.

When the blocks of the character shown in FIG. 10 are compared one after the other, or when the bit map data of each block is compared with those in the data unit 200, blocks 1, 2, 4, 5, 7, 8, 10, 11, 20, 22, 23, 25, 26, 28, 31, 32, 34, and 35 of the character shown in FIG. 10 share the same bit map data containing all white dots. Since the bit map data has been already stored as the bit map data of block 3 of the character shown in FIG. 3 at address A-03 in the data unit 200 shown in FIG. 11, the bit map data of these blocks are not stored in the data unit 200. Likewise, since the bit map data of blocks 9 and 12 have been already stored at address A-15 in the data unit 200 as shown in FIG. 11, the bit map data of these blocks are not stored in the data unit 200. Furthermore, since the bit map data of blocks 14, 16, and 17 have been already stored at address A-05 in the data unit 200 as shown in FIG. 11, the bit map data of these blocks are not stored in the data unit 200.

As a result, the data unit 200 stores the bit map data of 13 blocks out of 36 blocks, none of them being stored in duplicate for any other blocks sharing the same bit map data as shown in FIG. 11.

The address unit 100 stores storage addresses of the bit map data of 36 blocks.

FIGS. 12A and 12B show the correspondences between the blocks and the storage addresses, stored in the address unit 100, of the bit map data of the characters shown in FIGS. 3 and 10. As shown in FIG. 12A, the storage address A-8 of block 8 of the character shown in FIG. 3 is stored as the address data of block 14 sharing the same bit map data with block 8.

As shown in FIG. 12B, the storage address A-3 of the bit map data of block 3 of the character shown in FIG. 3 is stored as the address data of blocks 1, 2, 4, . . . , and 35 sharing the same bit map data in the character shown in FIG. 10.

Thus, the bit map data of all blocks of all characters are stored, not unduplicated, in the data unit 200 with the storage address of each bit map data block forming a character appropriately stored. Thus, the amount of data stored in the data unit 200 can be considerably reduced.

According to the present embodiment, bit map data of one character are stored after being divided into 36 blocks $BL_1$–$BL_{36}$. The data unit 200 stores binary data representing the bit map data composed of at least 0 bytes (if bit map data of all blocks have already been stored in the data unit 200) up to 288 (=8×36) bytes (if the bit map data of all blocks are different from one another, and none of them have been stored in the data unit 200).

Next, the requirement for storing a bit map font is compared between when bit map data of a character are stored as is without a packing process as in a conventional method and when they are stored as being packed after being divided into 36 blocks according to the packing method of the present embodiment.

At this time, a bit map font can be provided as 9,000 characters in Hirakana, Katakana, alphanumerics, Kanji based on the first and second JIS (Japan Industrial Standard)

levels. The bit map data of each character is represented by a 48×48 dot matrix.

In the conventional method, since data are not packed when they are stored, the data length of the bit map data of a character is 288 bytes (6 bytes×48), requiring a total of about 2,590,000 bytes (≈9,000×288) to store the bit map data of 9,000 characters. That is, an area of 2,590,000 bytes should be reserved for the data unit only.

Furthermore, since the data unit has a space of 2,590,000 bytes, more than 20 bits is required as address data so that all the space can be addressed. Therefore, the data length of address data should be 3 bytes in consideration of the efficiency in a data process, and an area of 27,000 bytes (=9000×3 bytes) should be reserved for the address unit.

As described above, a total of about 2,617,000 bytes (=about 2,590,000+27,000 bytes) are required in a conventional method to store the bit map font containing 9,000 characters.

On the other hand, according to the present embodiment, the above described 9,000 characters can be reduced to a total of 82,500 blocks to be stored by the above described data packing method. That is, an area of about 660,000 bytes (=about 82,500×8 bytes) should be reserved for the data unit 200.

Since the area of the data unit 200 is 660,000 bytes, the data length of address data should be 17 bits to address all the areas of the data unit 200. However, as the amount of bit map data of one block equals 8 bytes, the data length can be 14 bits with the lower 3 bits omitted. (When bit map data are unpacked, original addresses can be easily obtained by adding the lower 3 bits "000"). At this time, the 14-bit address data is represented by 2 bytes so that data can be processed simply. Since the bit map data of a character is composed of 36 blocks $BL_1$–$BL_{36}$, the amount of address data for one character equals 72 bytes (=2 bytes×36). Therefore, an area of 648,000 bytes (=72 bytes×9,000) should be reserved for the address unit 100.

As a result, the requirement for storing a bit map font stored as bit map data of the above described 9,000 characters is about 1,308,000 bytes (=about 660,000 bytes+648,000 bytes).

Thus, the packing ratio of the 9,000-character bit map font is about ½ (≈1,308,000÷2,617,000) according to the present embodiment.

Figure 13:
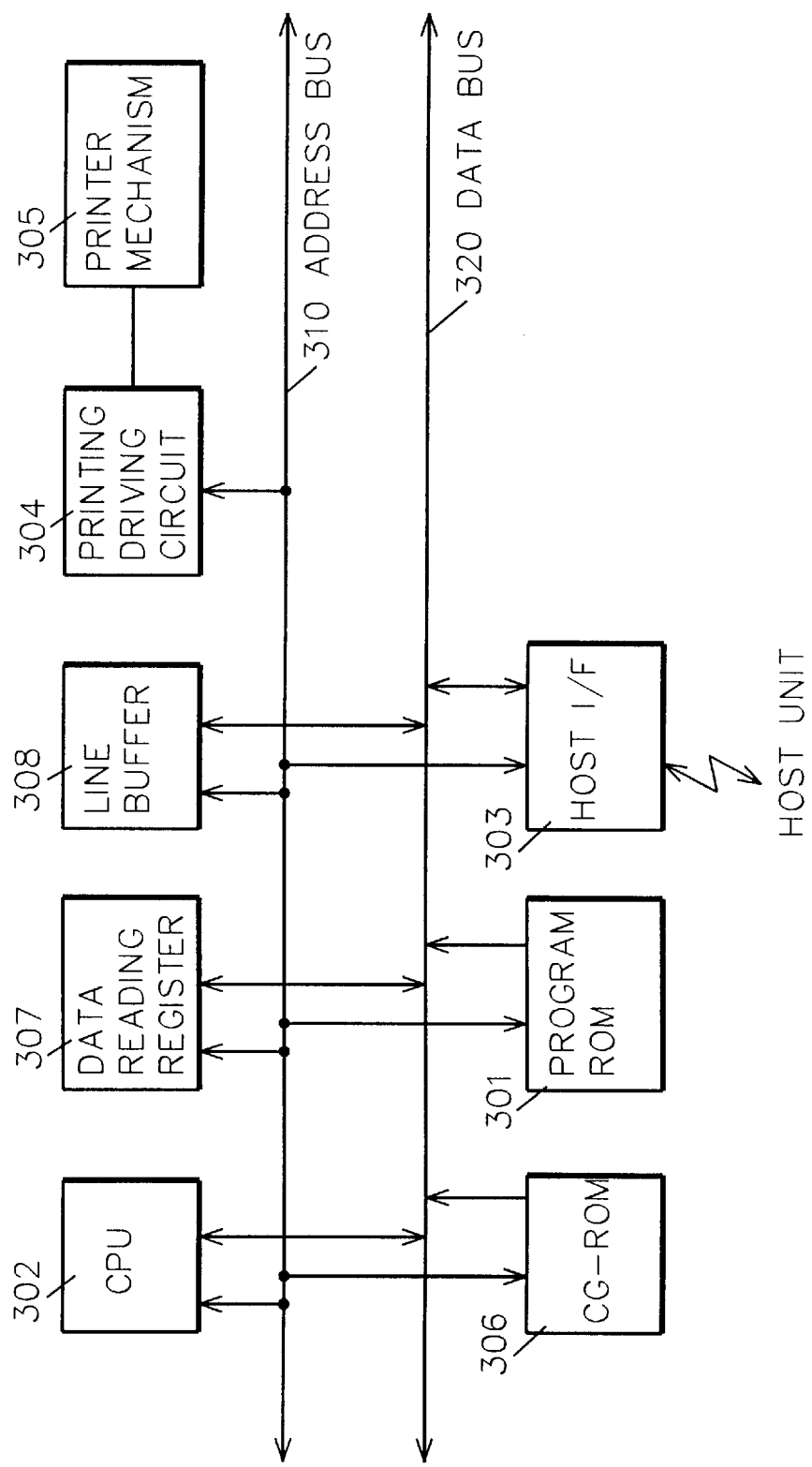
FIG. 13 is a block diagram showing the system configuration of the serial printer in the dot matrix method according to an embodiment of the present invention.

Next, FIG. 13 is a block diagram showing the configuration of the system of a serial printer in a dot matrix format in which data are printed out through a bit map font packed by the above described method.

A CPU 302 is connected to a program ROM (read only memory) 301, a host interface (I/F) 303, a printer driving circuit 304, a CG-ROM 306, a data reading register 307, and a line buffer 308 via an address bus 310 and a data bus 320.

The program ROM 301 stores a program for a microprogram for the CPU 302, a program for controlling a printing operation, etc.

The CPU 302 executes a program stored in the program ROM 301 to receive print data from a host unit (not shown in the drawings) through the host I/F 303 and control the printer driving circuit 304 so that the characters, symbols, etc. specified by the print data to be printed out in a 48×48 dot matrix format on a printer mechanism (printer engine) 305. The CPU 302 comprises a data transmitting unit for transmitting data to the line buffer 308.

The CG-ROM (character generator ROM) 306 is a mask ROM for storing a bit map font in a 48×48 bit map data format for each character as packed by the above described method. It comprises the address unit 100 and the data unit 200 as shown in FIG. 9.

The data reading register 307 for reading 8×8 bit data is used when 1-block bit map data (=8×8 dots) for a print character or a symbol represented by a 48×48 dot matrix format and read from the CG ROM 306 by the CPU 302 are bit-processed for a rotation. For example, it comprises eight 8-bit shift registers 307-1, 307-2, . . . , 307-8 as shown in FIG. 14.

Figure 15:
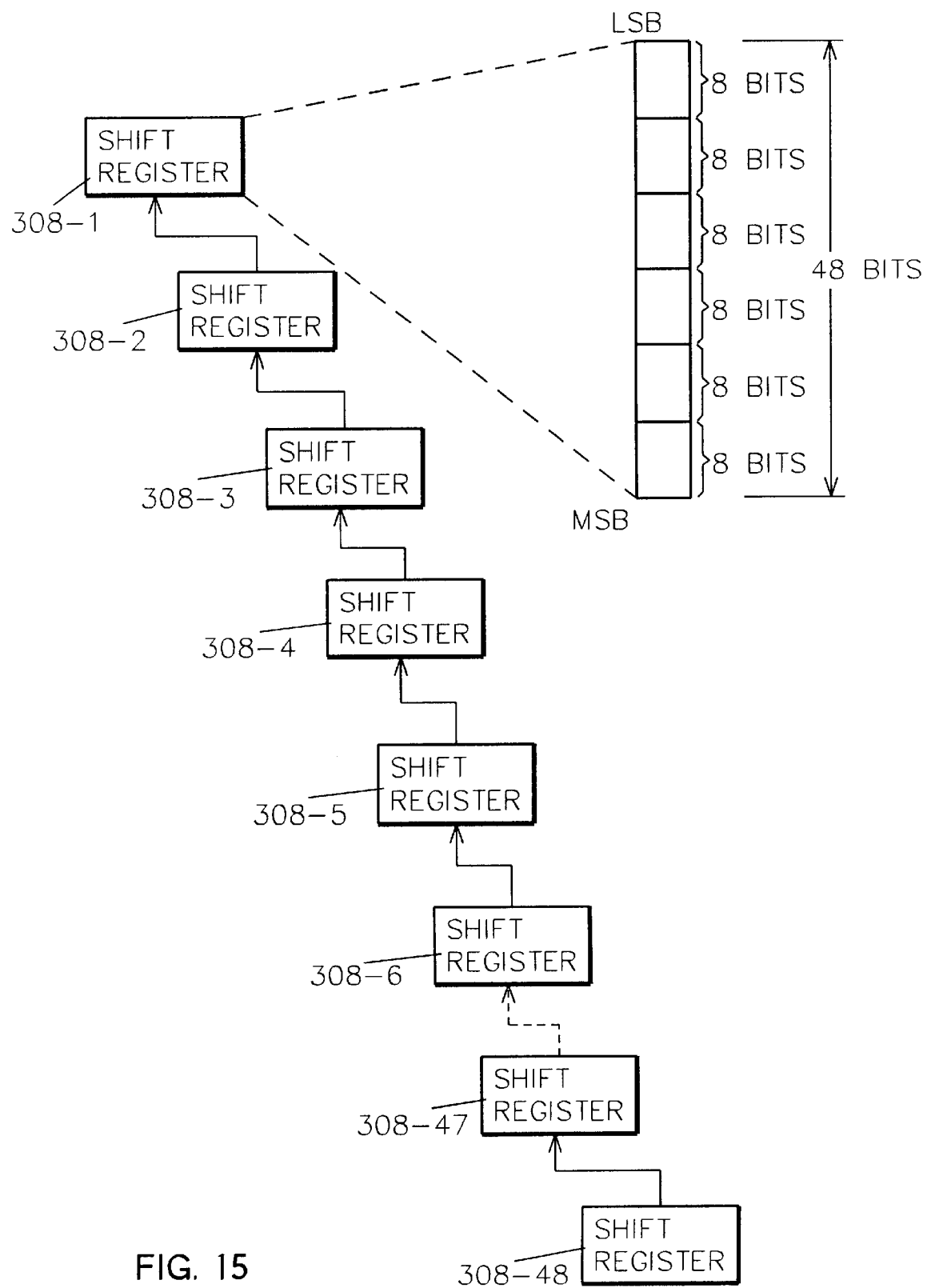
FIG. 15 shows an example of the configuration of a line buffer.

The line buffer 308 contains 2304 (=48×48) bits for storing 1-character bit map data printed by the printer mechanism 305, and stores 1-character or 1-symbol bit map data printed by the printer mechanism 305. FIG. 15 shows an example of a configuration of the line buffer 308. In the example, the line buffer 308 comprises forty-eight cascaded 48-bit shift registers 308-1–308-48.

The printer mechanism 305 comprises an actuator for separately driving a 48-dot printing head and 48 printing wire for the printing head; a driving mechanism for controlling the horizontal movement (in the main scanning direction on print paper) of the printing head; and a form feed mechanism for feeding print paper, etc.

The printer driving circuit 304 controls the operation of the 48-dot printing head of the printer mechanism 305, or controls a form-feeding operation under control of the CPU 302. A printing control unit comprises the printer driving circuit 304 and the CPU 302.

The host I/F 303 is connected via a cable applicable to the standards of a host unit (not shown in the drawings), a Centronics interface, and an RS-232C, receives print data from the host unit, and transmits various control signals and status data to and from the host unit.

Figure 16:
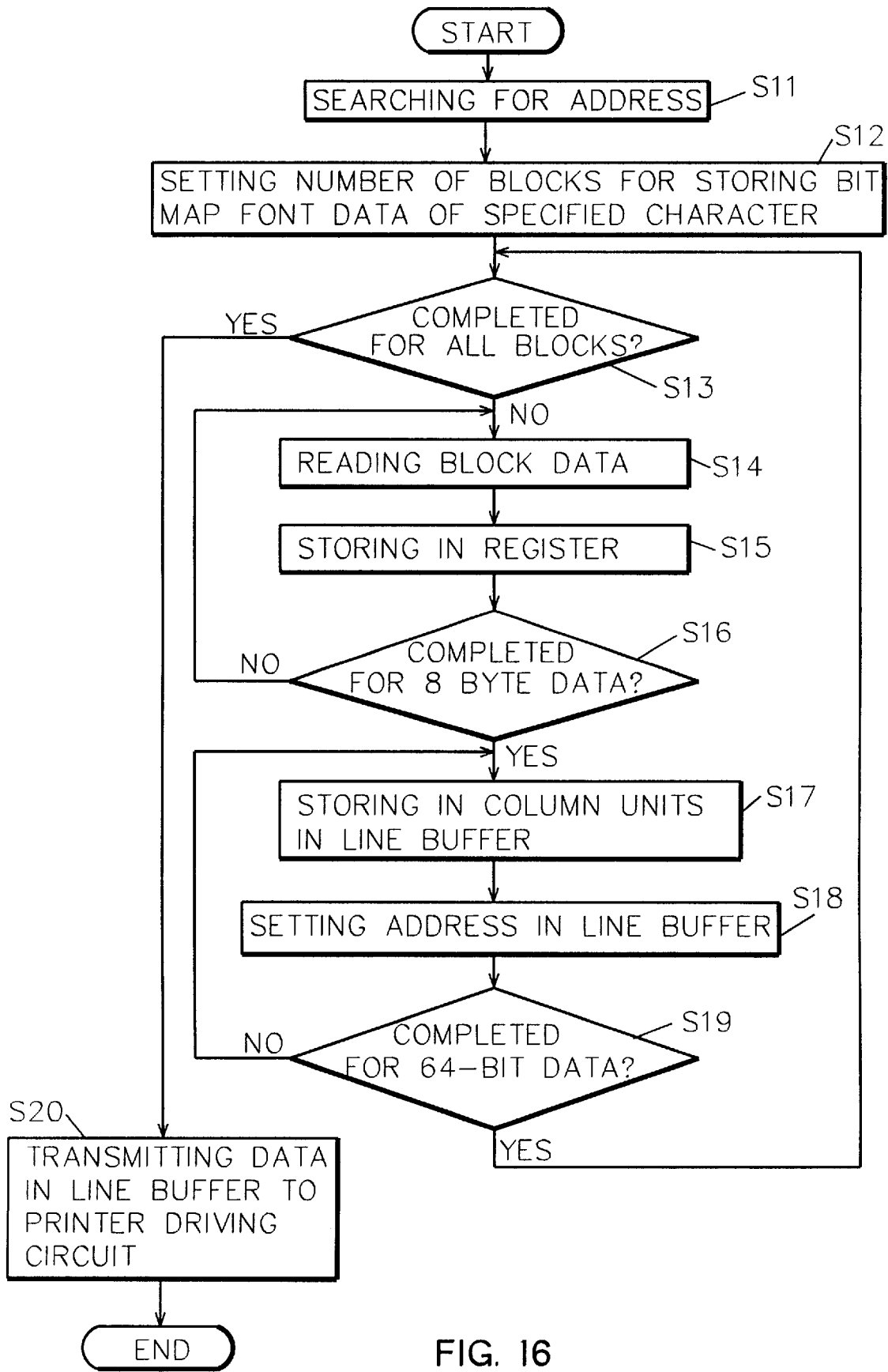
FIG. 16 is a flowchart showing the operation of the CPU when characters are printed out without a preprocessing.

Next, the print control operation performed by the CPU 302 of the serial printer in the above mentioned configuration is explained by referring to FIG. 16.

FIG. 16 is a flowchart for explaining the operation of the CPU 302 when a bit map font stored in the CG-ROM 306 is printed in a horizontal line-up format without a character process such as a rotation, etc.

The CPU 302 retrieves the address unit 100 (refer to FIG. 9) based on a code of a specified character on receiving it from the host unit through the host I/F 303 so that the leading address of the area in the data unit 200 (refer FIG. 9) of the CG-ROM 306 in which bit map data of the designated character (S11) can be obtained.

Next, the CPU 302 sets the number-of-block register (not shown in the drawings) for the total number of blocks of bit map data of specified characters (S12).

Then, the CPU 302 determines whether or not all the blocks of the bit map data of the specified characters have been read from the data unit 200 of the CG-ROM 306 (S13). If the data in all the blocks have not been read ("no" to S13), the 8×8 dot block $BL_1$ forming a specified character, that is, 8-byte bit map data are sequentially stored in the data reading register 307 by reading the data in byte units from the data unit 200 of the CG-ROM 306 according to the address, obtained in S11, in the data unit 200 (S14–S16).

Figure 17A:
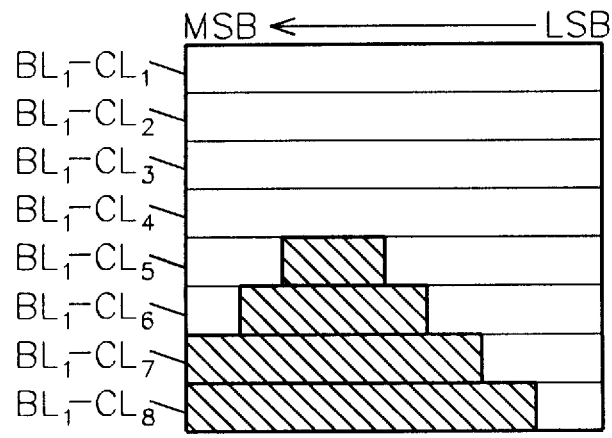
FIGS. 17A and 17B show a method of processing characters from a horizontal line-up format to a vertical line-up format.

In this process, as shown in FIG. 17A, for example, 8×8 dot bit map data of block $BL_1$ forming a specified character are stored in the data read reading register 307.

Then, the CPU 302 reads all 8×8 dot bit map data of block $BL_1$ from the CG-ROM 306. If the data have been stored in the data reading register 307 ("yes" to S16), then the 8×8 bit (=8 bytes) bit map data of block $BL_1$ ($BL_1$-$CL_1$–$BL_1$-$CL_8$)

stored in the data reading register 307 are transmitted and stored correspondingly in shift registers 308-1–308-8 of the line buffer 308 via the data bus 320 (S17–S19).

Figure 18A:
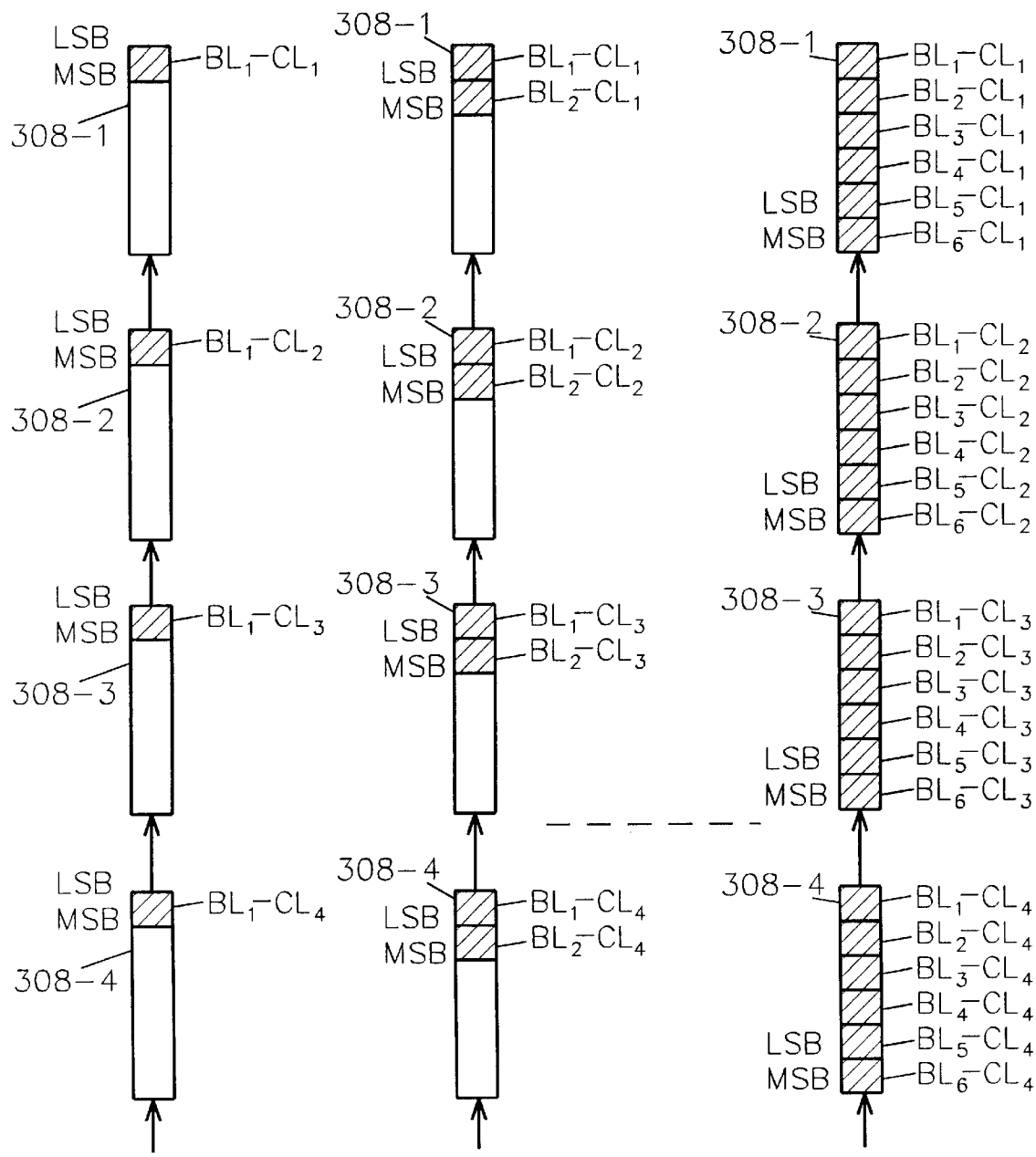
FIG. 18 shows a method of storing bit-map-font data of a character specified to a line buffer of the CPU when characters are lined up horizontally.
Figure 18:
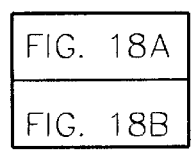
Figure 18B:
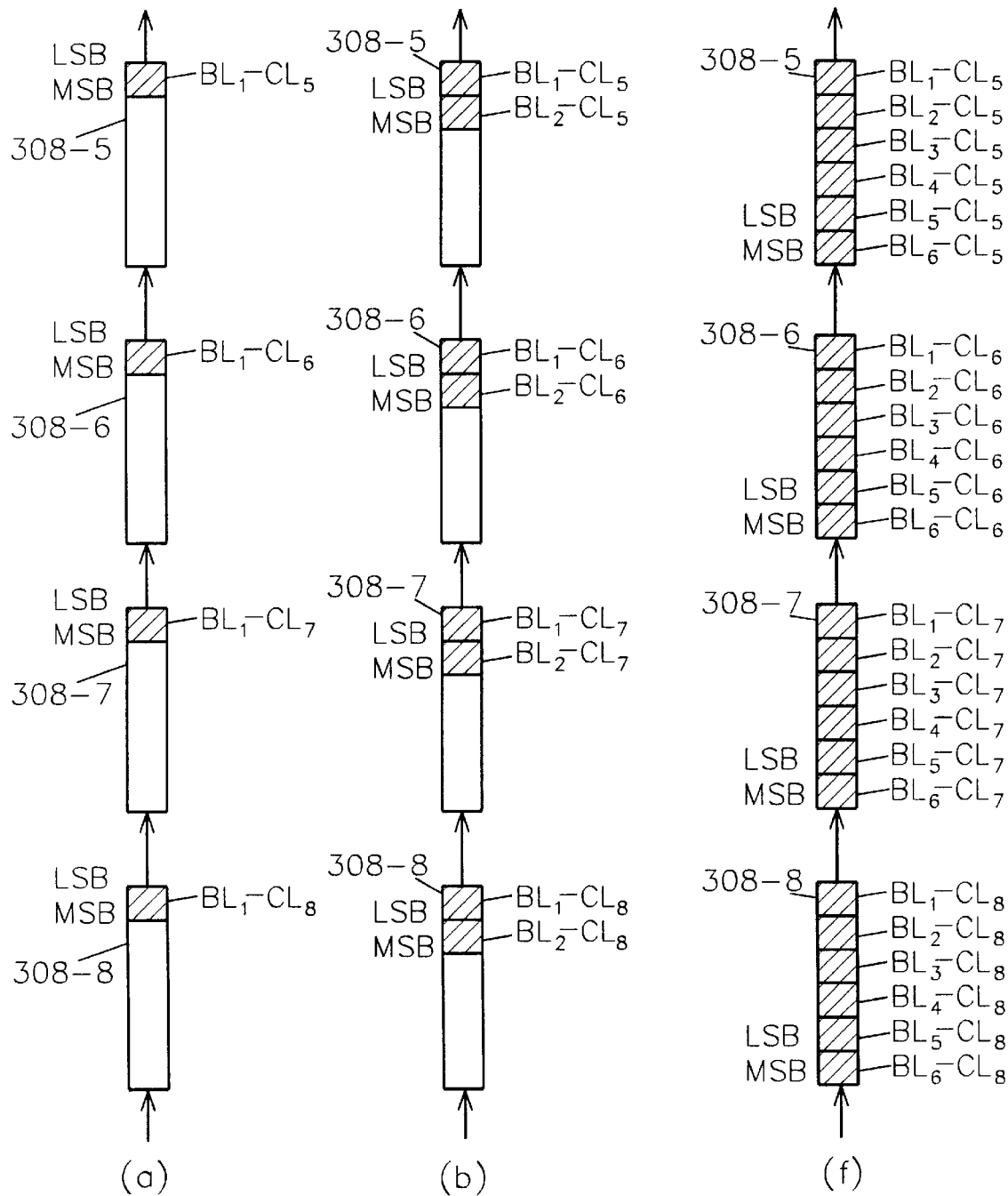

In this process, as shown in (a) in FIG. 18, the bit map data in the first column through the eighth column ($BL_1$-$CL_1$–$BL_1$-$CL_8$) of block $BL_1$ forming a specified character are distributed and stored into shift registers 308-1–308-8 of the line buffer 308.

Then, the CPU 302 performs the processes in steps S14–S19 on the bit map data of all the remaining blocks forming a specified character.

In this process, the print data in the first through eighth columns forming a specified character, that is, the bit map data of block $BL_1$–$BL_6$ are stored in shift registers 308-1–308-8 of the line buffer 308 in the order of (a), (b), . . . , (f) as shown in FIG. 18.

Likewise, the bit map data of blocks $BL_7$–$BL_{12}$, that is, the print data in the ninth through sixteenth columns are transmitted to shift registers 308-9–308-16. The bit map data of blocks $BL_{13}$–$BL_{18}$, that is, the print data in the seventeenth through twenty-fourth columns are transmitted to shift registers 308-17–308-24. Thus, the bit map data are sequentially stored in the shift registers. Finally, the bit map data of blocks $BL_{31}$–$BL_{36}$, that is, the print data in the forty-first through forty-eighth columns are transmitted to shift registers 308-41–308-48.

As a result, as shown in (f) in FIG. 18, 8-bit bit map data in the first through eighth columns of blocks $BL_1$–$BL_6$ are stored in shift registers 308-1–308-8 sequentially from the data in the first column. Although not shown in the drawings, the 8-bit bit map data in the ninth through sixteenth columns of blocks $BL_7$–$BL_{12}$ are stored in shift registers 308-9–308-16; and the 8-bit bit map data in the forty-first through forty-eighth columns of blocks $BL_{31}$–$BL_{36}$ are stored in shift registers 308-41–308-48. Thus, data are arranged in the line buffer 308 such that the 48×48 dot bit map data of specified characters can be printed in a horizontal line-up format.

Next, the CPU 302 reads the bit map data, of specified characters, stored as described above in the line buffer 308 in the order of shift register 308-1, 308-2, . . . , 308-48, and then transmits them in 8-bit units to the printer driving circuit 304 through the data bus 310 (S20).

On receiving from the CPU 302 all 48×48-bit bit map data of specified characters in a horizontal line-up format, the printer driving circuit 304 controls the printer mechanism 305 to print on paper the specified characters in a 48×48 dot matrix in a horizontal line-up format.

Figure 19:
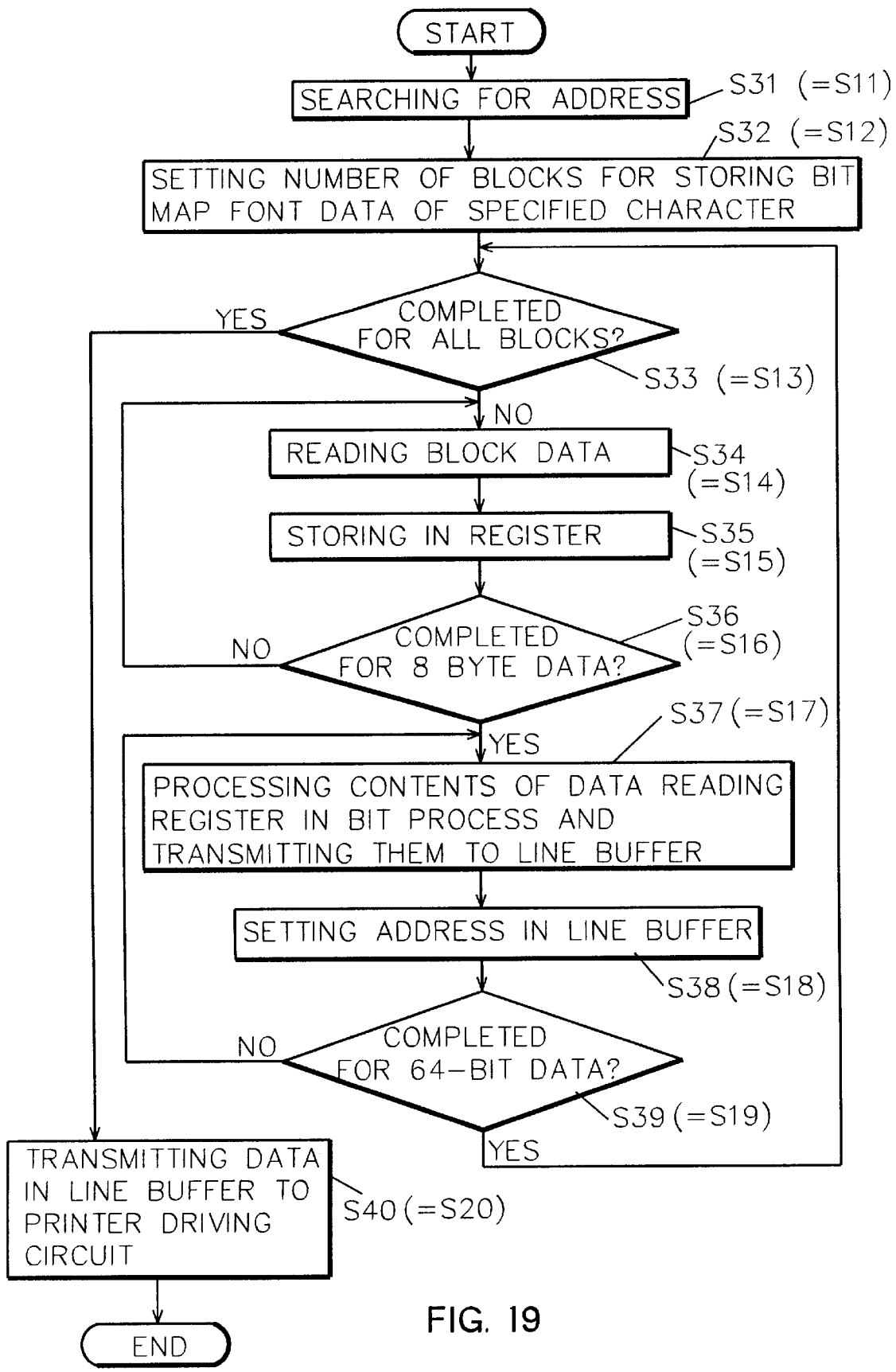
FIG. 19 is a flowchart showing the operation of the CPU when characters are printed out after being processed according to the embodiment of the present invention.

FIG. 19 is a flowchart showing the operation performed by the CPU 302 when bit map data of a character in a bit map font stored in the CG-ROM 306 are processed with a rotating operation, etc. before the printout of the character in a vertical line-up format in a Japanese word processing process.

In FIG. 19, the process steps also shown in the flowchart in FIG. 16 are provided with a correspondent number in FIG. 19. A correspondent number is given enclosed in parentheses to the right of each step number.

The process performed by the CPU 302 when a character is printed out after being preprocessed differs from a horizontal-line-up printing process without a preprocess in the process in step S37 only. That is, if, for example, bit map data of a character are rotated 90 degrees counterclockwise to output the character in a vertical line-up format, then the CPU 302 performs a logical arithmetic operation to rotate 8×8 bit map data (of a specified print character and stored in the data reading register 307) 90 degrees counterclockwise in step S35, and then transmits the 90-degree-rotated bit map data to the line buffer 308.

Practically, the data of the first bit in the first through eighth columns in block $BL_1$ ($BL_1$-$CL_1$-$b_1$–$BL_1$-$CL_8$-$b_1$) are transmitted to the sixth register (the sixth serially connected register) in the shift register 308-1. Likewise, the data of the second bit in the first through eighth columns in block $BL_1$ ($BL_1$-$CL_1$-$b_2$–$BL_1$-$CL_8$-$b_2$), the data of the third bit, . . . , and the data of the eighth bit ($BL_1$-$CL_1$-$b_8$–$BL_1$-$CL_1$-$b_8$) are transmitted to the sixth register in shift registers 308-2, 308-3, . . . , 308-8 respectively.

Figure 17B:
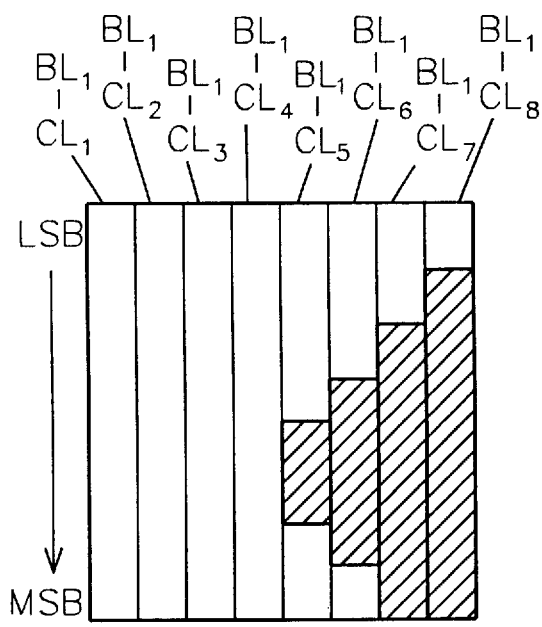
Figure 20:
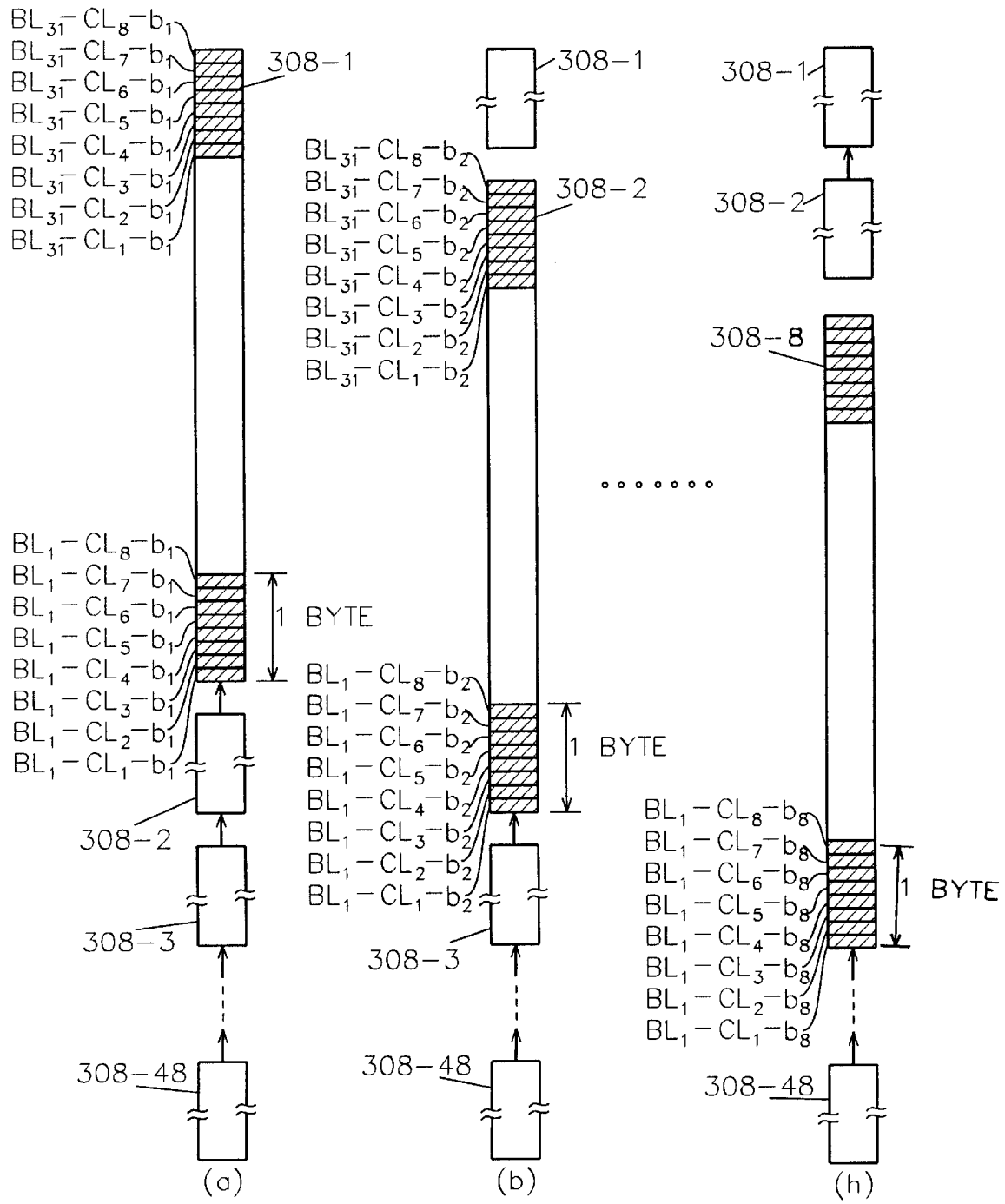
FIG. 20 shows a method of storing, in a line buffer, bit map data in block $BL_1$ in a vertical line up format.

In step S37, a process without the above described preprocessing on a character is performed such that the bit map data of a print specified character in a 8×8 dot matrix and stored in block BL1 shown in FIG. 17A are stored in shift registers 308-1–308-8 in the line buffer 308 in the arrangement in which the data are outputted as bit map data after being rotated 90 degrees counterclockwise as shown in FIG. 17B (refer to FIG. 20). Then, the process in step S37 is performed on the bit map data (of print specified characters) in all blocks $BL_1$–$BL_{36}$. As a result, bit map data of specified characters are stored in shift registers 308-1–308-48 in the line buffer 308 in the arrangement in which the specified characters are printed out after being rotated 90 degrees counterclockwise. At this time, as shown in FIG. 20, the data in the first bit in columns 41 through 48 in the rightmost block BL31 ($BL_{31}$-$CL_1$-$b_1$–$BL_{31}$-$CL_8$-$b_1$) are stored in the first register of the leading shift register 308-1 in the line buffer. $BL_1$- $CL_j$-$b_k$ shown in FIG. 20 indicates the k-th bit in byte $CL_j$ in block $BL_1$.

Figure 21:
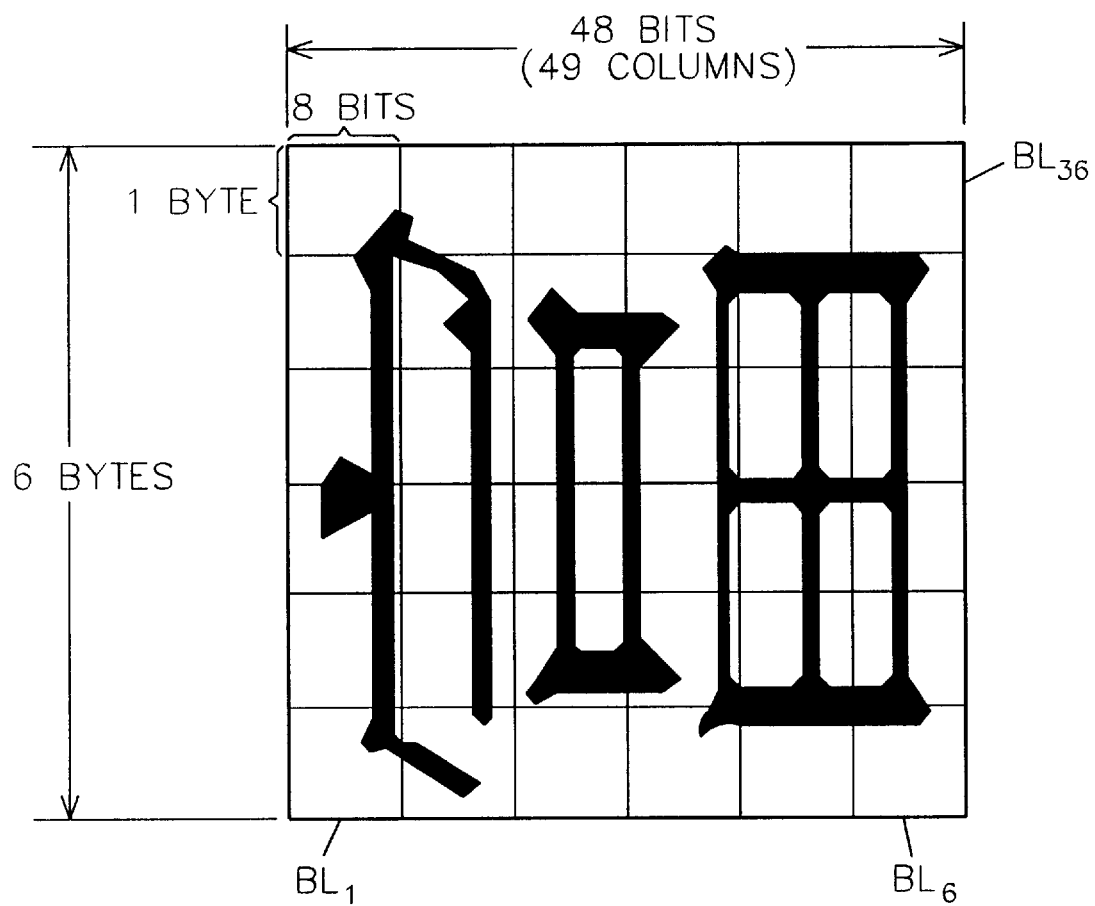
FIG. 21 shows the vertical line-up format of printed characters.

Thus, the bit map font stored in the CG-ROM 306 can be used to print out a specified character (for example, a character shown in FIG. 3) in a vertical line-up format as shown in FIG. 21 using the bit map pattern originally used for a horizontal line-up printing. Likewise, the CPU 302 receives a code of a character succeeding the specified character from the host unit through the host I/F 303, reads according to the code the bit map data from the data unit 200 of the CG-ROM 306, and stores in -the line buffer 308 the read data of each block of the character succeeding the specified character after rotating them by 90 degrees. Thus, by repeating these processes, characters are printed in a vertical line-up format.

As described above, in the present embodiment, bit map data as shown in FIG. 20 are processed in block units in an 8×8-dot matrix when the bit map data of a character to be printed in a vertical lineup format are stored in the line buffer 308 after being rotated 90 degrees clockwise. Furthermore, since the bit map data are divided into blocks in an 8×8-dot (8 bytes×8) dot matrix format which is applicable to a data process performed by the CPU 302, the bits can be processed at a high speed as a firmware process performed by the CPU 302 when the bit map data in block $BL_1$ (i=1, 2, . . . , 36) forming specified characters and stored to the 8×8 register 307 are stored in the line buffer 308 so that they can be printed in the vertical line-up format which is especially important for Japanese or Chinese characters.

Therefore, the data can be processed at a much higher speed than when conventional unpacked data of a bit map font are used for a vertical line-up print format. Furthermore, the bit map data to be printed can be read from the CG-ROM 306 by referring to the address stored in the address unit 100 in the CG-ROM 306 so that a target area in the data unit 200 in the CG-ROM 306 can be directly accessed. As a result, the bit map data for print characters can be stored more efficiently at a higher speed than in conventional methods.

Bit map data are prepared in a 48×48-dot bit map font in the above described embodiment. However, the present invention is not limited to this application, and can be applied to a high-resolution bit map font such as 56×56-dot, 64×64-dot, 96×96-dot bit map fonts, etc. According to the present invention, the higher the bit map font resolution is, the larger the packing ratio of the bit map font becomes and the shorter the time taken for processing and unpacking the bit map data of each character.

Additionally, the present invention is not limited in applicable bit map font type, but can be applied to any print character type such as Mincho, Gothic, brush-pen, handwriting, pen, textbook, square, round Gothic, and round types. Furthermore, blocks can be divided not only into 8×8 dots, but optionally divided for any dot matrix format applicable to the length of data processed in a font packing device or a font unpacking device. Also, a character process is not limited to a rotation of characters, but various character process can be performed at a higher speed than in conventional methods.

Furthermore, the present invention can be effectively applied to bit map font used not only for a serial printer in the present embodiment but also for other types of printers such as a page printer, line printer, etc. and for display units such as a CRT display, liquid crystal display, etc.

Figure 22:
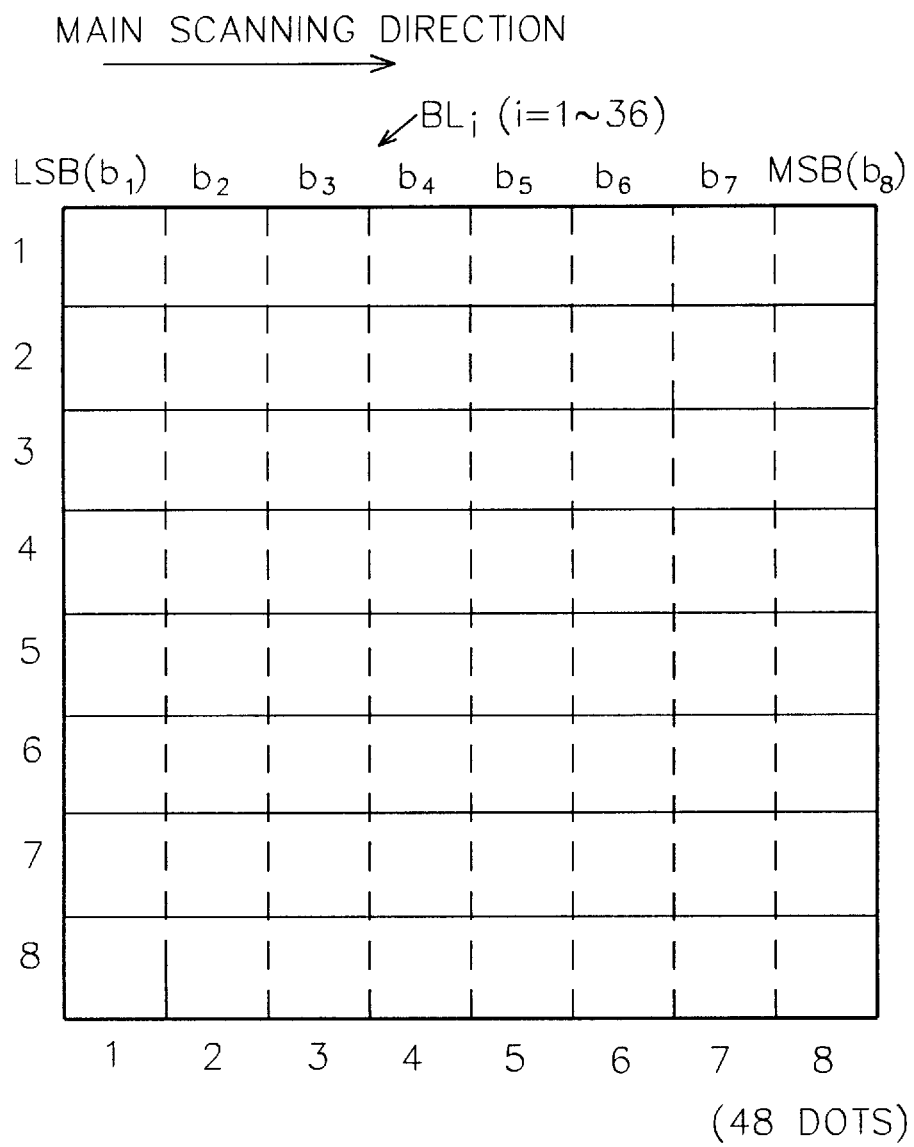
FIG. 22 shows an example of another method of dividing a character into byte-blocks.

Additionally, bit map data can be divided into blocks forming a character in a bit map font by methods other than the one used in the above method. For example, the data can be divided in parallel in the main scanning direction of print characters as shown in FIG. 22. The data can be divided not in 8-bit (1-byte) units, but to any bit length, for example one word (16 bits) depending on the data length in a font packing device or a font unpacking device.

As described above, the font packing device according to the present invention processes data at a high speed with a simple hardware configuration by packing a bit map font at a high packing ratio, storing it in a storing media, unpacking the bit map data of each character in the bit map font, and processing the bit map data of characters to be printed in a vertical line-up format, etc.

Furthermore, the font unpacking device according to the present invention unpacks and processes at a high speed bit map data of each character, in bit map font, packed and stored by the above described font packing device.

What is claimed is:

1. A font packing device comprising:
    dividing means for equally dividing bit map data of a character in a bit map font into n×m (n and m indicates integers equal to or larger than 3) rectangular areas in a matrix form, wherein each rectangular area has a data length applicable to an internal process performed by a font unpacking device;
    detecting means for detecting a plurality of rectangular areas including bit map data shared among said rectangular areas obtained by equally dividing the character by said dividing means;
    bit map data storing means for storing for one common block all the bit map data shared among said rectangular areas with a bit map image maintained without packing; and
    address information storing means for storing address information indicating a storage area of the bit map data for each rectangular area in said bit map data storing means.

2. The font packing device according to claim 1, wherein said dividing means divides said character into multiples of 8×8-bit rectangular areas.

3. The font packing device according to claim 1, wherein said bit map data storing means and said address information storing means respectively store bit map data and address information in the same storing media.

4. A font unpacking device for unpacking a character font previously packed and stored in data storage after equally dividing bit map data of a character into a plurality of rectangular areas in a matrix form and detecting a plurality of rectangular areas including bit map data shared among said rectangular areas, said device comprising:
    bit map data storing means for storing for one common block all bit map data shared among said rectangular areas with a bit map image maintained without packing;
    address information storing means for storing address information indicating a storage area of the bit map data for each rectangular area in said bit map data storing means;
    bit map data reading means for reading all bit map data of all rectangular areas of specified characters according to said address information from said bit map data storing means; and
    unpacking means for unpacking a packed character in the character font by combining bit map data in each of said rectangular areas read by said bit map data reading means.

5. The font unpacking device according to claim 4, wherein:
    said bit map data storing means stores bit map data for one block in a rectangular area to be read out by said bit map data reading means; and
    wherein said unpacking means rotates the bit map data in the rectangular areas to rotate a character by optional degrees and unpacks the bit map data to the character.

6. A font unpacking device for unpacking a character font stored after being divided into a plurality of rectangular areas in a matrix form, said device comprising:
    bit map data storing means for storing for one common block all bit map data shared among said rectangular areas of each character divided into i×k rectangular areas with a bit map image maintained without packing, wherein i and k indicate integers equal to or larger than 3;
    address information storing means for storing address information indicating a storage area of the bit map data for each rectangular area in said bit map data storing means;
    bit map data reading means for reading all bit map data of all rectangular areas of specified characters according to said address information from said bit map data storing means;
    a line buffer for storing print data printed by a printing head depending on a configuration of said printing head;
    data transmitting means for transmitting to a corresponding position in said line buffer the bit map data in first bit, second bit, through n-th bit in first through m-th columns in each of n×m-bit rectangular areas if a character is printed after being rotated; and
    print control means for outputting to said printing head the bit map data transmitted from said data transmitting means and stored in said line buffer to be printed out.

7. The font unpacking device according to claim 6, wherein said character is printed in a horizontal line-up format.

8. The font unpacking device according to claim 7, wherein the bit map data stored in said bit map data storing means are stored after being divided into a plurality of rectangular areas of a size applicable to a length of data processed in an internal process performed by said font unpacking device for unpacking the bit map data.

9. The font unpacking device according to claim 6, wherein said character is printed in a vertical line-up format.

10. A font storing device for storing a character after equally dividing bit map data of the character into a plurality of rectangular areas in a matrix form and detecting a plurality of rectangular areas including bit map data shared among said rectangular areas, said device comprising:

bit map data storing means for storing for one common block all bit map data shared among said rectangular areas with a bit map data image maintained without packing;

address information storing means for storing address information indicating a storage area of the bit map data for each rectangular area in said bit map data storing means;

bit map data reading means for reading all bit map data of all rectangular areas of specified characters according to said address information from said bit map data storing means; and unpacking means for unpacking a packed character in a character font by combining bit map data in each of said rectangular areas read by said bit map data reading means.

* * * * *